(12) United States Patent
Sheng

(10) Patent No.: US 11,854,238 B2
(45) Date of Patent: Dec. 26, 2023

(54) INFORMATION INSERTION METHOD, APPARATUS, AND DEVICE, AND COMPUTER STORAGE MEDIUM

(71) Applicant: TENCENT TECHNOLOGY (SHENZHEN) COMPANY LIMITED, Guangdong (CN)

(72) Inventor: Hui Sheng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 396 days.

(21) Appl. No.: 17/384,516

(22) Filed: Jul. 23, 2021

(65) Prior Publication Data

US 2021/0352343 A1    Nov. 11, 2021

Related U.S. Application Data

(63) Continuation of application No. PCT/CN2020/098462, filed on Jun. 28, 2020.

(30) Foreign Application Priority Data

Jun. 27, 2019  (CN) .......................... 201910569777.2

(51) Int. Cl.
*G06V 20/40* (2022.01)
*G06V 10/25* (2022.01)

(52) U.S. Cl.
CPC .............. *G06V 10/25* (2022.01); *G06V 20/46* (2022.01); *G06V 20/49* (2022.01)

(58) Field of Classification Search
CPC ...... G06V 10/25; G06V 10/454; G06V 10/82; G06V 20/46; G06V 20/49; H04N 5/272;

(Continued)

(56) References Cited

U.S. PATENT DOCUMENTS 8,768,099 B2 *  7/2014  Derrenberger ......... H04N 5/272
                                                          382/284
2009/0132376 A1   5/2009  Kollin et al.
(Continued)

FOREIGN PATENT DOCUMENTS

CA    2393803 C  *  9/2010  ............. G06T 15/20
CN   103974126 A     8/2014
(Continued)

OTHER PUBLICATIONS

Supplementary European Search Report dated Oct. 10, 2022 in Application No. 20831160.5, pp. 1-38.
(Continued)

*Primary Examiner* — Carol Wang
(74) *Attorney, Agent, or Firm* — ARENTFOX SCHIFF LLP

(57) ABSTRACT

An information insertion method is provided. In the method, background inclination information of a preset entity in a video frame to be inserted with information is acquired. The background inclination information is of a bearing surface of the preset entity in the video frame. At least one piece of foreground inclination information corresponding to at least one piece of multimedia information is acquired. An inclination difference between the background inclination information and each of the at least one piece of foreground inclination information is acquired, to obtain at least one piece of inclination difference information. Target multimedia information that meets an inclination difference condition is determined from the at least one piece of multimedia information according to the at least one piece of inclination difference information. The target multimedia information is inserted onto the bearing surface of the preset entity of the video frame to obtain a target video frame.

20 Claims, 9 Drawing Sheets

(58) Field of Classification Search
CPC ....... H04N 21/23424; H04N 21/23418; H04N 21/812; H04N 21/2668; G06T 7/13; G06T 7/215; G06T 2207/10016
See application file for complete search history.

(56) References Cited

U.S. PATENT DOCUMENTS

| | | |
|---|---|---|
| 2009/0249386 A1 | 10/2009 | Shan et al. |
| 2010/0122286 A1* | 5/2010 | Begeja ................. G06Q 30/02 725/34 |
| 2012/0180084 A1 | 7/2012 | Huang et al. |
| 2012/0259712 A1 | 10/2012 | Hyndman et al. |
| 2013/0141530 A1* | 6/2013 | Zavesky ................ G06T 19/20 348/43 |
| 2016/0142792 A1 | 5/2016 | Lee et al. |
| 2017/0150231 A1 | 5/2017 | Brulotte |
| 2017/0278289 A1 | 9/2017 | Marino et al. |
| 2019/0075339 A1 | 3/2019 | Smith |

FOREIGN PATENT DOCUMENTS

| | | | | |
|---|---|---|---|---|
| CN | 104735465 A | | 6/2015 | |
| CN | 106375858 A | * | 2/2017 | ......... H04N 21/2541 |
| CN | 106375858 A | | 2/2017 | |
| CN | 107169135 A | | 9/2017 | |
| CN | 109168034 A | | 1/2019 | |
| CN | 110213629 A | | 9/2019 | |
| CN | 110300316 A | * | 10/2019 | ....... H04N 21/23418 |
| EP | 2819095 A1 | | 12/2014 | |
| WO | WO2017/164716 A1 | | 9/2017 | |

OTHER PUBLICATIONS

Wei Chen et al: "Automatic insertion of advertisements into a video sequence", Machine Learning and Cybernetics (ICMLC), 2010 International Conference on, IEEE, Piscataway, NJ, USA, Jul. 11, 2010.

Chang CH et al: "Virtual spotlighted advertising for tennis videos", Journal of Visual Communication and Image Representation, Academic Press, Inc, US, vol. 21, No. 7, Oct. 1, 2010.

International Search Report Issued ln Application PCT/CN2020/098462 dated Oct. 12, 2020, with English Translation, (5 pages).

Written Opinion Issued in Application PCT/CN2020/098462 dated Oct. 12, 2020 (4 pages).

* cited by examiner

INFORMATION INSERTION METHOD, APPARATUS, AND DEVICE, AND COMPUTER STORAGE MEDIUM

RELATED APPLICATIONS

This application is a continuation of International Application No. PCT/CN2020/098462 filed on Jun. 28, 2020, which claims priority to Chinese Patent Application No. 201910569777.2 filed on Jun. 27, 2019. The entire disclosures of the prior applications are hereby incorporated by reference in their entirety.

FIELD OF THE TECHNOLOGY

This application relates to information processing technologies in the computer field, including an information insertion method, apparatus, and device, and a computer storage medium.

BACKGROUND OF THE DISCLOSURE

In a video information playback scenario of the Internet, in addition to playing video information, multimedia information also needs to be displayed. Generally, display forms of the multimedia information mainly include two forms: inserted multimedia information and pop-up multimedia information. The inserted multimedia information is a form in which multimedia information such as a three-dimensional model or a physical object is inserted into a preset insertion entity or object such as a desktop or a table top in video information.

For implementation of multimedia information insertion, to improve an insertion effect, generally a staff member separately inserts a plurality of pieces of multimedia information into a preset insertion entity in a video frame, and determines, through manual picture determining and selecting, target multimedia information having the highest degree of adaptation to the preset insertion entity in the video frame. However, in the foregoing multimedia information insertion process, intelligence is low because the multimedia information is manually implemented.

SUMMARY

Embodiments of this disclosure include an information insertion method, apparatus, device, and a non-transitory computer-readable storage medium.

The technical solutions of the embodiments of this disclosure can be implemented as follows:

An embodiment of this disclosure provides an information insertion method. In the method, background inclination information of a preset entity in a video frame to be inserted with information is acquired. The background inclination information is of a bearing surface of the preset entity in the video frame. At least one piece of foreground inclination information corresponding to at least one piece of multimedia information is acquired. Each of the at least one piece of foreground inclination information is of a to-be-contacted surface of the corresponding multimedia information. An inclination difference between the background inclination information and each of the at least one piece of foreground inclination information is acquired, to obtain at least one piece of inclination difference information. Target multimedia information that meets an inclination difference condition is determined from the at least one piece of multimedia information according to the at least one piece of inclination difference information. Further, the target multimedia information is inserted onto the bearing surface of the preset entity of the video frame to obtain a target video frame.

An embodiment of this disclosure provides an information insertion apparatus, including processing circuitry. The processing circuitry is configured to acquire background inclination information of a preset entity in a video frame to be inserted with information, the background inclination information being of a bearing surface of the preset entity in the video frame. The processing circuitry is configured to acquire at least one piece of foreground inclination information corresponding to at least one piece of multimedia information, each of the at least one piece of foreground inclination information being of a to-be-contacted surface of the corresponding multimedia information. The processing circuitry is configured to acquire an inclination difference between the background inclination information and each of the at least one piece of foreground inclination information, to obtain at least one piece of inclination difference information. The processing circuitry is configured to determine, from the at least one piece of multimedia information according to the at least one piece of inclination difference information, target multimedia information that meets an inclination difference condition. Further, the processing circuitry is configured to insert the target multimedia information onto the bearing surface of the preset entity of the video frame to obtain a target video frame.

An embodiment of this disclosure provides an information insertion device, including a memory, configured to store an executable instruction. The information insertion device further includes a processor, configured to implement the information insertion method provided in embodiments of this disclosure when executing the executable instruction stored in the memory.

An embodiment of this disclosure provides a non-transitory computer-readable storage medium that stores instructions which, when executed by a processor, cause the processor to implement the information insertion method provided in embodiments of this disclosure.

Beneficial effects of the embodiments of this disclosure include at least the following: Because target multimedia information to be inserted into a video frame is obtained by comparing inclination information, the target multimedia information and a preset video frame to be inserted with information have a relatively high degree of adaptation. Therefore, a process of automatically selecting target multimedia information having a high degree of adaptation is implemented. Therefore, when multimedia information insertion is completed according to the target multimedia information, multimedia information can be intelligently inserted into the video frame. In this way, intelligence of multimedia information insertion can be improved.

DESCRIPTION OF EMBODIMENTS

Figure 1A:
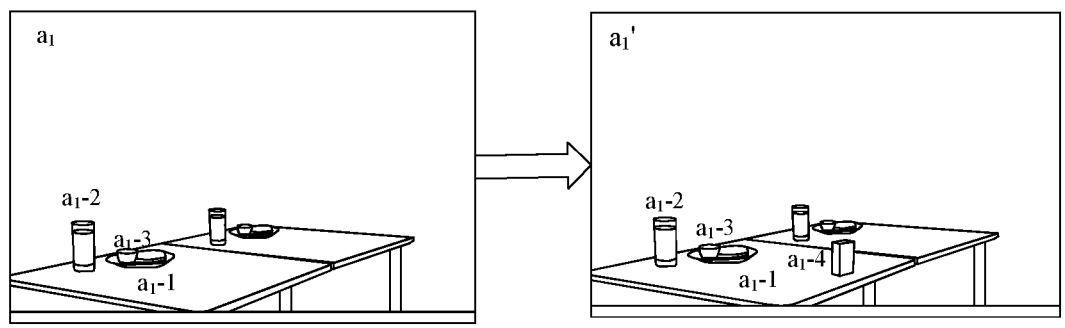
FIG. 1a to FIG. 1d are schematic diagrams of exemplary inserted advertisements.

To make the objectives, technical solutions, and advantages of the present disclosure clearer, the following provides further detail with reference to the accompanying drawings. The described embodiments are merely exemplary and are not intended to limit the scope of the present disclosure. All other embodiments obtained by a person of ordinary skill in the art shall fall within the protection scope of the present disclosure.

In the following description, the term "some embodiments" describes subsets of all possible embodiments, but it may be understood that "some embodiments" may be the same subset or different subsets of all the possible embodiments, and can be combined with each other without conflict.

Unless otherwise defined, meanings of all technical and scientific terms used in the embodiments of this disclosure are the same as that usually understood by a person skilled in the technical field to which the present disclosure belongs. Terms used in the embodiments of this disclosure are merely intended to describe objectives of the embodiments of this disclosure, but are not intended to limit this disclosure.

Before the embodiments of this disclosure are described in detail, a description is made on nouns and terms in the embodiments of this disclosure, and the nouns and terms in the embodiments of this disclosure are applicable to the following explanations.

1) Video information can refer to when continuous image changes per second exceed a predetermined quantity of frames, the human eye cannot distinguish a single static picture according to the persistence of vision principle, and the continuous image changes appear to be a smooth continuous visual effect. Such continuous images can correspond to video information, for example, a single video file or a video segment.

2) A video library can refer to a database for storing video information.

3) A shot can refer to segment of video continuously shot by a camera for a period of time. One shot includes several video frames. In the embodiments of this disclosure, the shot can also be referred to as video shot information.

4) A Video frame can refer to a minimum unit of a video, and a static image. For example, when video information is played, an image at any moment is a video frame.

5) Multimedia information can refer to a combination of a computer technology and video technology. In the embodiments of this disclosure, the multimedia information can be information for insertion into a video frame, for example, an advertisement picture.

6) An insertion entity can be a physical object in the real world that is presented in a video frame and that is used for inserting multimedia information, such as a table and a bar counter in a video frame.

7) Foreground inclination can correspond to inserted multimedia information, and refer to visual inclination information presented by multimedia information in a corresponding image.

8) Background inclination can correspond to an insertion entity, and refer to visual inclination information presented by the insertion entity in a corresponding video frame.

When multimedia information displayed in video information includes advertisements, the advertisements may be divided into a pop-up advertisement (Video-Out) and an inserted advertisement (Video-In) according to display forms of the advertisements. The pop-up advertisement is a scene-based pop-up advertisement that displays a pop-up advertisement related to video information content based on the video information content such as a car, a face, a target, and a scene in video information. The inserted advertisement is in a soft advertisement form, and means that a print advertisement or a physical advertisement is inserted at a location such as a desktop, a wall, a photo frame, a bar counter, and a billboard of a video frame.

FIG. 1a to FIG. 1d are schematic diagrams of exemplary inserted advertisements. FIG. 1a is a schematic diagram of a scenario in which a milk carton is inserted on a desktop. The left figure is a video frame $a_1$ before the milk carton is inserted, and the right figure is a video frame $a_1'$ after the milk carton is inserted. As shown in the left figure of FIG. 1a, a table $a_1$-1 is placed in the video frame $a_1$, and a cup $a_1$-2 and a plate $a_1$-3 are placed on the table $a_1$-1. As shown in the right figure of FIG. 1a, in addition to the cup $a_1$-2 and the plate $a_1$-3, a milk carton $a_1$-4 is placed on the table $a_1$-1 in the video frame $a_1'$. Here, the milk carton $a_1$-4 is an inserted advertisement.

Figure 1B:
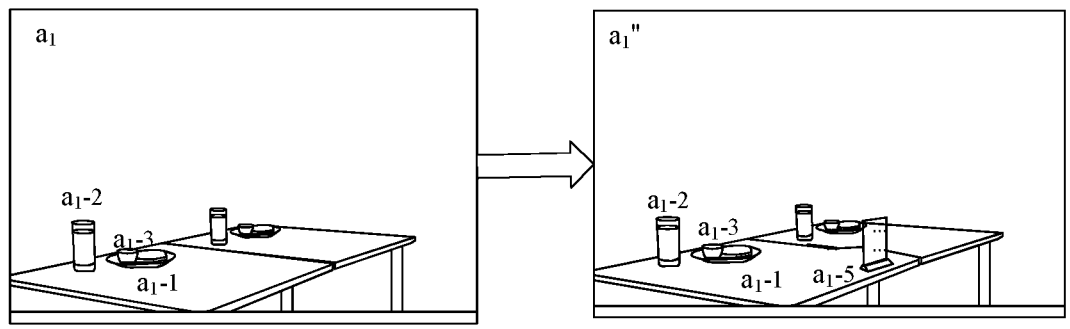

FIG. 1b is a schematic diagram of a scenario in which a three-dimensional model with a poster is inserted on a desktop. The left figure is a video frame $a_1$ before the three-dimensional model with a poster is inserted, and the right figure is a video frame $a_1''$ after the three-dimensional model with a poster is inserted. The left figure of FIG. 1b is consistent with the left figure of FIG. 1a. The right figure of FIG. 1b shows that in addition to a cup $a_1$-2 and a plate $a_1$-3, a three-dimensional model $a_1$-5 with a poster is placed on a table $a_1$-1 in the video frame $a_1''$. Herein, the three-dimensional model $a_1$-5 with a poster is an inserted advertisement.

Figure 1C:
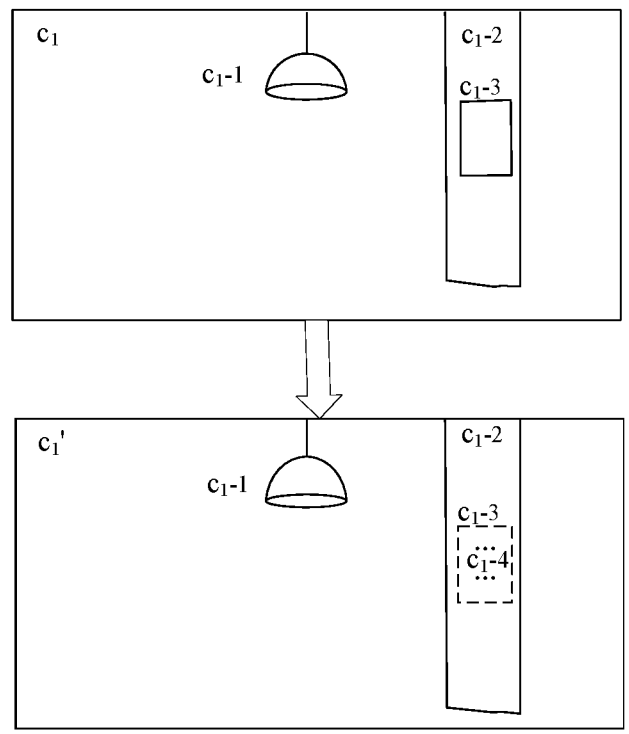

FIG. 1c is a schematic diagram of a scenario in which a poster is inserted in a photo frame. The upper figure is a video frame $c_1$ not inserted with the poster, and the lower figure is a video frame $c_1'$ inserted with the poster. As shown in the upper figure of FIG. 1c, a ceiling lamp $c_1$-1, a wall $c_1$-2, and a photo frame $c_1$-3 are placed in the video frame $c_1$. As shown in the lower figure of FIG. 1c, the ceiling lamp $c_1$-1, the wall $c_1$-2, and the photo frame $c_1$-3 are placed in the video frame $c_1'$, and a poster $c_1$-4 is further displayed in the photo frame $c_1$-3. Herein, the poster $c_1$-4 is an inserted advertisement.

Figure 1D:
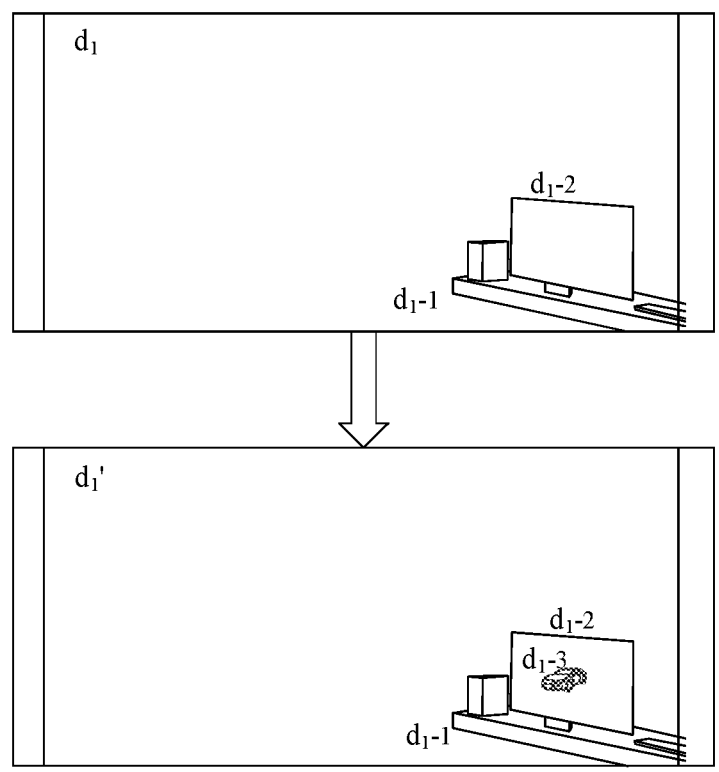

FIG. 1d is a schematic diagram of a scenario in which a poster is inserted on a display screen. The upper figure is a video frame $d_1$ not inserted with the poster, and the lower figure is a video frame $d_1'$ inserted with the poster. As shown in the upper figure of FIG. 1*d*, a display screen $d_1$-2 is placed on a table $d_1$-1 in the video frame $d_1$. As shown in the lower figure of FIG. 1*d*, in the video frame $d_1'$, the display screen $d_1$-2 placed on the table $d_1$-1 further displays a poster $d_1$-3. Herein, the poster $d_1$-3 is an inserted advertisement.

For the foregoing inserted advertisements, generally, there are a plurality of different-angle physical pictures corresponding to a physical advertisement (which refers to a promoted entity, for example, milk, a car, or a beverage). A process of selecting, from the plurality of different-angle physical pictures, a physical picture that has an orientation similar to that of an insertion entity in a video frame as a foreground physical picture to perform advertisement insertion is currently manually completed by an experienced designer. For example, when multimedia information such as a physical advertisement is to be inserted on a desktop, an advertiser uploads 30 physical pictures corresponding to the physical advertisement. A designer inserts the 30 physical pictures onto a desktop in a video frame, and then manually determines and selects a picture. The whole process takes 30 minutes. Therefore, as described above, when multimedia information is inserted into an insertion entity in a video frame, time costs can be high, efficiency can be low, degree of automation can be low, and intelligence can be low.

In view of this, embodiments of this disclosure include an information insertion method, apparatus, and device, and a computer storage medium. When multimedia information is inserted into an insertion entity in a video frame, time costs can be reduced, and insertion efficiency, a degree of automation, and intelligence can be improved.

The following describes an exemplary application of an information insertion device provided in an embodiment of this disclosure. The information insertion device provided in this embodiment of this disclosure may be implemented as various types of user terminals such as a smartphone, a tablet computer, or a notebook computer, or may be implemented as a server. The following describes an exemplary application when the information insertion device is implemented as a server.

Figure 2:
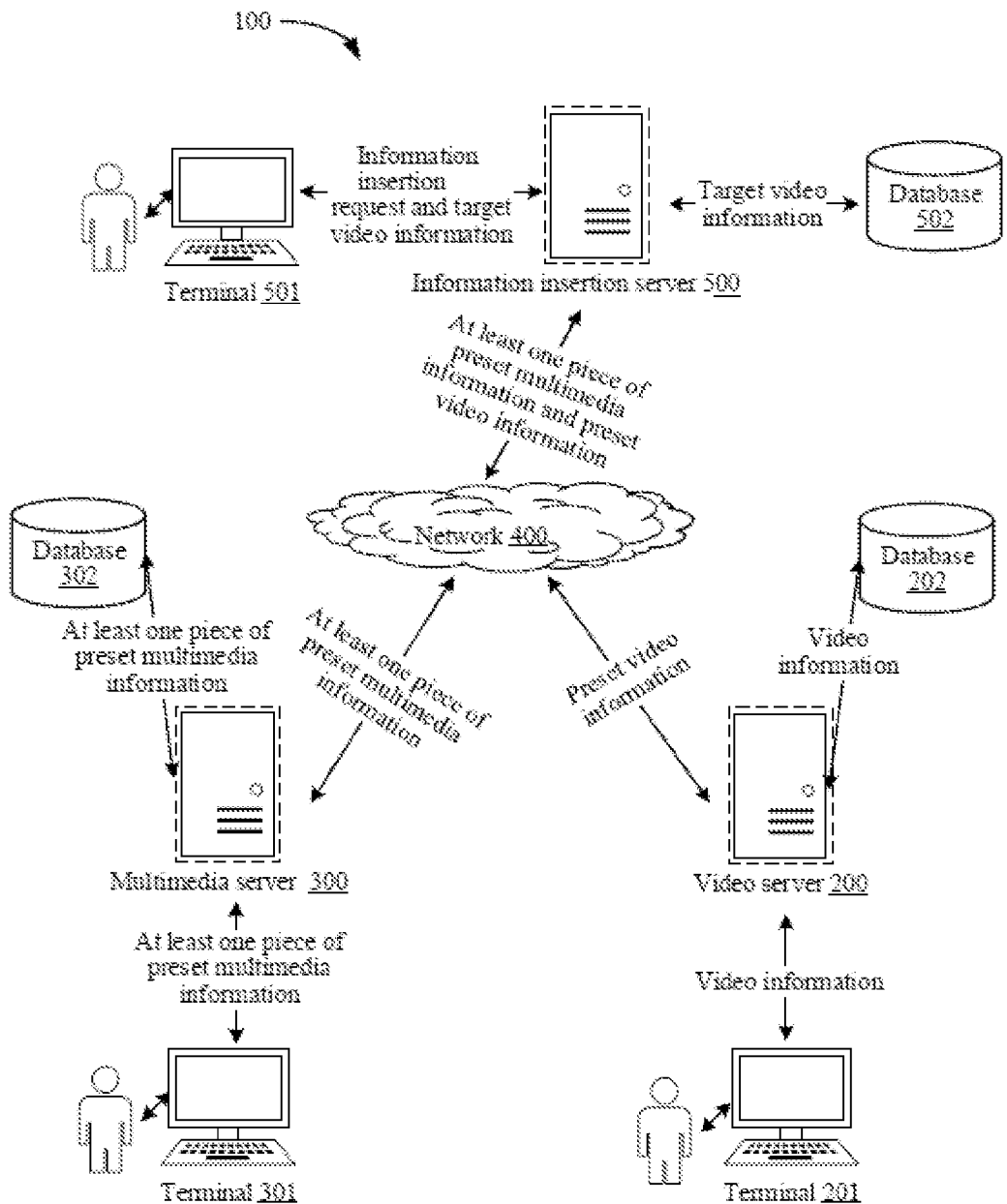
FIG. 2 is a schematic architecture diagram of an information insertion system according to an embodiment of this disclosure.

Referring to FIG. 2, FIG. 2 is an exemplary schematic architecture diagram of an information insertion system according to an embodiment of this disclosure. As shown in FIG. 2, to support an information insertion application, in an information insertion system 100, an information insertion server 500 connects to a multimedia server 300 and a video server 200 by using a network 400. The network 400 may be a wide area network, a local area network, or a combination thereof. In addition, the information insertion system 100 further includes a terminal 501, a database 502, a terminal 201, a database 202, a terminal 301, and a database 302. The information insertion server 500 is separately connected to the terminal 501 and the database 502, the video server 200 is separately connected to the terminal 201 and the database 202, and the multimedia server 300 is separately connected to the terminal 301 and the database 302. In addition, a network corresponding to the connection herein may also be a wide area network, a local area network, or a combination thereof.

The terminal 201 is configured to, when a video uploading object (a user) uploads video information, store the video information into the database 202 by using the video server 200.

The database 202 is configured to store video information uploaded by using the terminal 201 and the video server 200.

The video server 200 is configured to store video information uploaded by the terminal 201 into the database 202, and obtain preset video information from the database 202, and send the preset video information to the information insertion server 500 by using the network 400.

The terminal 301 is configured to, when multimedia information delivery corresponding to a promotional entity (e.g., an advertisement physical object or a multimedia object) is performed for a multimedia information delivery object (e.g., an advertiser), store at least one piece of preset multimedia information corresponding to the promotional entity into the database 302 by using the multimedia server 300.

The database 302 is configured to store at least one piece of preset multimedia information uploaded by using the terminal 301 and the multimedia server 200.

The multimedia server 300 is configured to store at least one piece of preset multimedia information delivered by the terminal 301 into the database 302, and obtain at least one piece of preset multimedia information from the data 302, and send the at least one piece of preset multimedia information to the information insertion server 500 by using the network 400.

The terminal 501 is configured to receive a touch operation of a user, generate an information insertion request, and send the information insertion request to the information insertion server 500; and receive target video information sent by the information insertion server 500, and play the target video information on a graphical interface.

The database 502 is configured to store target video information obtained by the information insertion server 500 through processing.

The information insertion server 500 is configured to receive an information insertion request sent by the terminal 501, in response to the information insertion request, obtain preset video information from the database 202 by using the video server 200, and obtain at least one piece of preset multimedia information from the database 302 by using the multimedia server 300; acquire background inclination information of a preset insertion entity in a preset video frame to be inserted with information, the preset video frame to be inserted with information being a minimum unit for inserting multimedia information in preset video information, and the background inclination information being inclination information of a bearing surface of the preset insertion entity in the preset video frame to be inserted with information; acquire at least one piece of foreground inclination information corresponding to at least one piece of preset multimedia information, each of the at least one piece of foreground inclination information being inclination information of a to-be-contacted surface of corresponding preset multimedia information; acquire an inclination difference between the background inclination information and the at least one piece of foreground inclination information, to obtain at least one piece of inclination difference information; determine, from the at least one piece of preset multimedia information according to the at least one piece of inclination difference information, target multimedia information that meets a preset inclination difference condition; and insert the target multimedia information onto the bearing surface of the preset insertion entity of the preset video frame to be inserted with information to obtain a target video frame, so as to obtain target video information corresponding to the preset video information, and store the target video information into the database 502; and, when receiving a video loading request, obtain target video information from the database 502 in response to the video loading request, and send the target video information to the terminal 501, so as to play the target video information on the graphical interface of the terminal 501.

Figure 3:
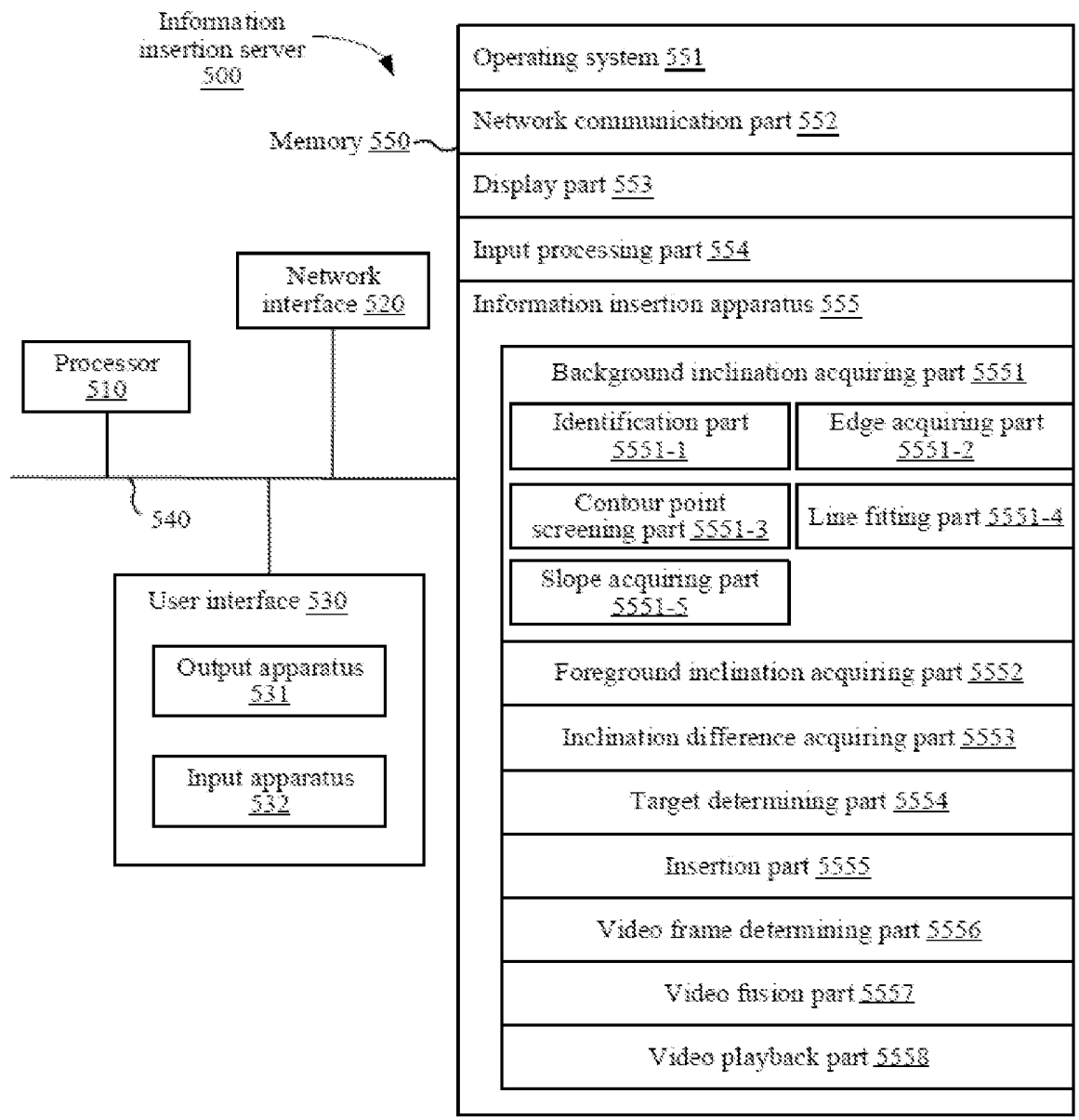
FIG. 3 is a schematic structural diagram of an information insertion server according to an embodiment of this disclosure.

Referring to FIG. 3, FIG. 3 is a schematic structural diagram of an information insertion server according to an embodiment of this disclosure. An information insertion server 500 shown in FIG. 3 includes at least one processor 510, a memory 550, at least one network interface 520, and a user interface 530. Various assemblies in the server 500 are coupled together via a bus system 540. It may be understood that the bus system 540 is configured to implement connection and communication between the components. In addition to a data bus, the bus system 540 further includes a power bus, a control bus, and a status signal bus. However, for ease of clear description, all types of buses are marked as the bus system 540 in FIG. 3.

The processor 510 may be an integrated circuit chip having a signal processing capability, for example, a general purpose processor, a DSP, or another PLD, discrete gate, transistor logical device, or discrete hardware component. The general purpose processor may be a microprocessor, any conventional processor, or the like.

The user interface 530 includes one or more output apparatuses 531 that enable presentation of media content, including one or more speakers and/or one or more visual displays. The user interface 530 further includes one or more input apparatuses 532, including a user interface component that facilitates user input, such as a keyboard, a mouse, a microphone, a touchscreen display, a camera, another input button, and a control.

The memory 550 includes a volatile memory or a non-volatile memory, or may include a volatile memory and a non-volatile memory. The non-volatile memory may be a read-only memory (ROM), and the volatile memory may be a random access memory (RAM). The memory 550 described in this embodiment of this disclosure is to include any other suitable type of memories. The memory 550 may include one or more storage devices that are physically away from the processor 510.

In some embodiments, the memory 550 can store data to support various operations, and examples of the data include programs, modules, and data structures, or subsets or supersets thereof, as illustrated below.

An operating system 551 includes a system program configured to process various basic system services and perform a hardware-related task, for example, a framework layer, a core library layer, and a driver layer, and is configured to implement various basic services and process a hardware-related task.

A network communications part 552 is configured to reach another computing device through one or more (wired or wireless) network interfaces 520. Exemplary network interfaces 520 include: Bluetooth, wireless compatible authentication, a universal serial bus (USB), and the like.

A display part 553 is configured to display information by using an output apparatus 531 (e.g., a display screen or a speaker) associated with one or more user interfaces 530 (e.g., a user interface configured to operate a peripheral device and display content and information).

An input processing part 554 is configured to detect one or more user inputs or interactions from one of the one or more input apparatuses 532 and translate the detected input or interaction.

In some embodiments, the information insertion apparatus provided in this embodiment of this disclosure may be implemented in a software manner. FIG. 3 shows an information insertion apparatus 555 stored in the memory 550. The information insertion apparatus 555 may be software in a form of a program and a plug-in, and includes the following software parts: a background inclination acquiring part 5551, a foreground inclination acquiring part 5552, an inclination difference acquiring part 5553, a target determining part 5554, an insertion part 5555, a video frame determining part 5556, a video fusion part 5557, and a video playback part 5558. The background inclination acquiring part 5551 includes an identification part 5551-1, an edge acquiring part 5551-2, a contour point screening part 5551-3, a line fitting part 5551-4, and a slope acquiring part 5551-5. Functions of each part are described below.

In some other embodiments, the information insertion apparatus provided in this embodiment of the disclosure may be implemented by using hardware. For example, the information insertion apparatus provided in this embodiment of the disclosure may be a processor in a form of a hardware decoding processor, programmed to perform the information insertion method provided in the embodiments of the disclosure. For example, processing circuitry such as the processor in the form of a hardware decoding processor may use one or more application-specific integrated circuits (ASIC), a DSP, a programmable logic device (PLD), a complex programmable logic device (CPLD), a field-programmable gate array (FPGA), or other electronic components.

With reference to an exemplary application and implementation of the information insertion server provided in the embodiment of this disclosure, the following describes an information insertion method provided in the embodiment of this disclosure.

Figure 4:
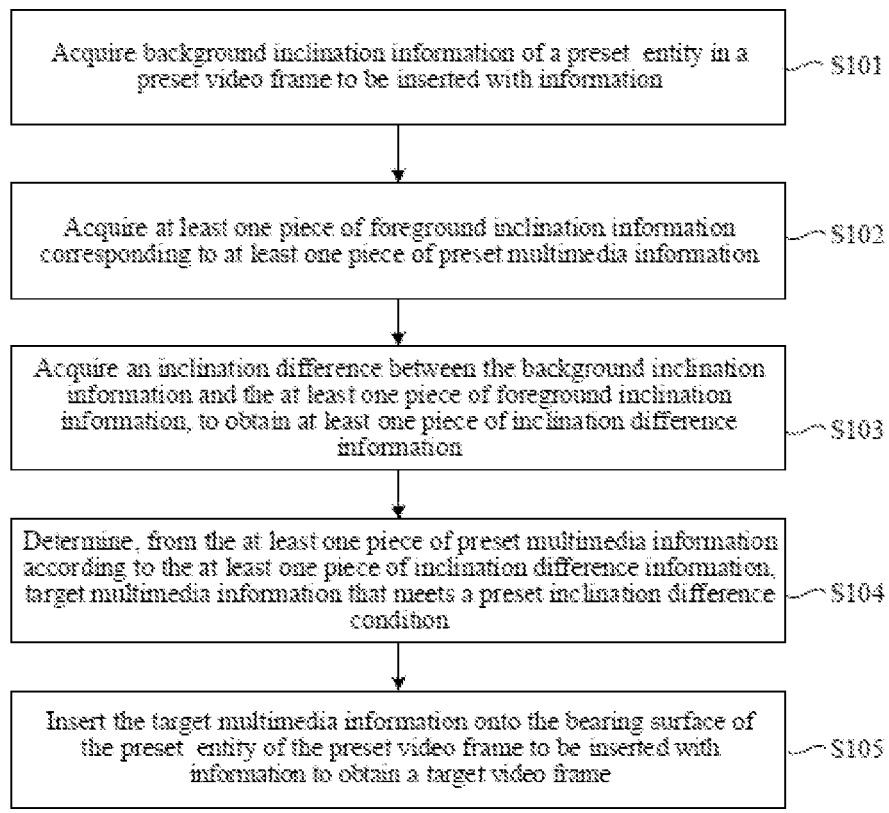
FIG. 4 is a schematic flowchart of an information insertion method according to an embodiment of this disclosure.

FIG. 4 is a schematic flowchart of an information insertion method according to an embodiment of this disclosure, and steps shown in FIG. 4 are combined for description. In addition, an execution body in this embodiment of this disclosure is an information insertion server, which is referred to as an insertion device below.

In step S101, background inclination information of a preset insertion entity in a preset video frame to be inserted with information is acquired.

In this embodiment of this disclosure, when a multimedia delivery object such as an advertising agency or an advertiser performs entity promotion, and multimedia information is delivered in determined preset video information, the delivered video information is preset video information. The insertion device determines, from the preset video information, a piece of to-be-inserted multimedia information and a video frame that includes the preset insertion entity, so as to obtain the preset video frame to be inserted with information. Herein, the preset insertion entity can refer to an entity that is pre-acquired by the insertion device and that is used for carrying multimedia information.

Next, to determine an insertion location of the multimedia information in the preset video frame to be inserted with information, the insertion device acquires visual inclination information of the preset insertion entity in the preset video frame to be inserted with information, to obtain the background inclination information of the preset insertion entity in the preset video frame to be inserted with information.

The preset video frame to be inserted with information is a minimum unit that is in the preset video information and that is used for inserting multimedia information, and refers to one video frame in the preset video information, for example, the first video frame or the third video frame. In addition, the preset video frame to be inserted with information includes image information corresponding to the preset insertion entity, and the preset insertion entity is a physical object, such as a table or a bar counter, that has a bearing surface in the preset video frame to be inserted with information. In addition, the background inclination information is inclination information of the bearing surface of the preset insertion entity in the preset video frame to be inserted with information, for example, at least one slope of a lower edge of a table or at least one slope of a lower edge of a bar counter.

In step S102, at least one piece of foreground inclination information corresponding to at least one piece of preset multimedia information is acquired.

Because an entity promoted by a multimedia delivery object is a physical object (e.g., a milk carton or a three-dimensional model displaying a poster), picture information at different angles correspondingly exists for the promoted entity, and is the at least one piece of preset multimedia information.

In this embodiment of this disclosure, the insertion device acquires inclination information of a to-be-contacted surface of each of the at least one piece of preset multimedia information, so as to obtain the at least one piece of foreground inclination information corresponding to the at least one piece of preset multimedia information. That is, each of the at least one piece of foreground inclination information is inclination information of a to-be-contacted surface of preset multimedia information corresponding to the foreground inclination information, for example, at least one slope of a lower edge of a milk carton or at least one slope of a lower edge of a three-dimensional model displaying a poster.

Herein, the at least one piece of preset multimedia information is used as picture information from at least one angle corresponding to a multimedia object, and is a corresponding picture that includes only the promoted entity and that is obtained through picture processing such as matting or masking.

There is no execution sequence between S101 and S102. That is, S101 may be executed before S102, S102 may be executed before S101, and S101 and S102 may be simultaneously executed. This is not specifically limited in this embodiment of this disclosure.

In step S103, an inclination difference between the background inclination information and the at least one piece of foreground inclination information is acquired, to obtain at least one piece of inclination difference information.

In this embodiment of this disclosure, after acquiring the background inclination information and the at least one piece of foreground inclination information, the insertion device compares the background inclination information with each of the at least one piece of foreground inclination information, so as to obtain an inclination difference between the background inclination information and each piece of foreground inclination information, and therefore, obtains the inclination difference between the background inclination information and the at least one piece of foreground inclination information, that is, the at least one piece of inclination difference information. That is, the at least one piece of inclination difference information is a set including the inclination difference between the background inclination information and each of the at least one piece of foreground inclination information.

In step S104, from the at least one piece of preset multimedia information according to the at least one piece of inclination difference information, target multimedia information that meets a preset inclination difference condition is determined.

In this embodiment of this disclosure, the preset inclination difference condition is preset in the insertion device and is used for determining multimedia information to be inserted into the preset video frame to be inserted with information, and the at least one piece of inclination difference information is in a one-to-one correspondence with the at least one piece of preset multimedia information. Therefore, after obtaining the at least one piece of inclination difference information, the insertion device performs determining on each of the at least one piece of inclination difference information by using the preset inclination difference condition, to determine inclination difference information that meets the preset inclination difference condition and determine corresponding preset multimedia information from the at least one piece of preset multimedia information, that is, the target multimedia information. Herein, the preset inclination difference condition is information with a minimum inclination difference.

In this embodiment of this disclosure, that the insertion device determines, from the at least one piece of preset multimedia information according to the at least one piece of inclination difference information, the target multimedia information that meets the preset inclination difference condition includes the following: the insertion device selects minimum inclination difference information from the at least one piece of inclination difference information according to the preset inclination difference condition; and determines preset multimedia information corresponding to the minimum inclination difference information from the at least one piece of preset multimedia information, to obtain initial target multimedia information. Herein, the initial multimedia information may be directly used as the target multimedia information for information insertion processing. To improve an insertion effect of the multimedia information, rendering processing may be further performed on the initial target multimedia information according to the preset video frame to be inserted with information to obtain the target multimedia information.

It may be understood that, a picture display attribute (e.g., saturation, brightness, and contrast) corresponding to the initial target multimedia information is different from a picture display attribute corresponding to preset to-be-inserted video information. Therefore, the insertion device performs rendering processing on the initial target multimedia information according to the preset video frame to be inserted with information, so that a difference between a picture display attribute of the preset multimedia information (e.g., the target multimedia information) obtained after rendering processing and a picture display attribute of the preset video frame to be inserted with information is minimized, harmony of a foreground and a background is implemented, insertion of the target multimedia information is optimized, and an insertion effect of the target multimedia information is improved.

In step S105, the target multimedia information is inserted onto the bearing surface of the preset insertion entity of the preset video frame to be inserted with information to obtain a target video frame.

In this embodiment of this disclosure, after the insertion device obtains the target multimedia information, a to-be-inserted object is also determined, so that the target multimedia information is inserted into the preset video frame to be inserted with information, and information insertion for the preset video frame to be inserted with information is completed. Herein, the insertion device inserts the target multimedia information onto the bearing surface of the preset insertion entity of the preset video frame to be inserted with information, and the preset video frame to be inserted with information inserted with the target multimedia information is the target video frame. Herein, an insertion location of the target multimedia information on the bearing surface is a preset insertion location. For example, when the bearing surface is a desktop, the preset insertion location may be a location near an object placed on the desktop, may be a location farthest from key information on the desktop, may be a location closest to the key information on the desktop, or may be any location on the desktop.

It may be understood that, by comparing the background inclination information with the at least one piece of foreground inclination information, foreground inclination information that is in the at least one piece of foreground inclination information and that has a smallest difference from the background inclination information is selected, and preset multimedia information corresponding to the foreground inclination information having the smallest difference is used as the target multimedia information, so that the target multimedia information is inserted into the preset video frame to be inserted with information, thereby implementing an information insertion solution for automatically selecting a physical object (multimedia object), and improving an insertion effect.

In some embodiments, S101 that the insertion device acquires the background inclination information of the preset insertion entity in the preset video frame to be inserted with information includes sub steps (a)-(e):

(a) Identify, in the preset video frame to be inserted with information, a region in which the preset insertion entity is located, to obtain an initial insertion location region.

In this embodiment of this disclosure, an image corresponding to the preset insertion entity exists in the preset video frame to be inserted with information. The insertion device identifies, in the preset video frame to be inserted with information, a region in which the preset insertion entity is located, and the identified region is the initial insertion location region.

In some embodiments, a preset instance segmentation algorithm such as a mask region-based convolutional neural network (R-CNN) may be used when the initial insertion location region is acquired. The initial insertion location region is obtained by entering the preset video frame to be inserted with information and performing target detection and instance segmentation on the preset video frame to be inserted with information based on entity feature information of the preset to-be-insertion entity.

(b) Acquire insertion location edge information of the initial insertion location region.

In this embodiment of this disclosure, after obtaining the initial insertion location region, the insertion device performs edge processing on the initial insertion location region to obtain the insertion location edge information. Herein, the insertion location edge information refers to an edge corresponding to the preset insertion entity in the preset video frame to be inserted with information.

In some embodiments, when the insertion device acquires the insertion location edge information of the initial insertion location region, the insertion device first selects the insertion location region from the initial insertion location region according to a preset region feature. That is, because only a valid location region in the initial insertion location region can be used for carrying the preset multimedia information, the insertion device needs to further screen the initial insertion location region, that is, select the valid location region from the initial insertion location region according to the preset region feature, so as to obtain the insertion location region. Herein, the preset region feature is a feature of the bearing surface used for carrying the preset multimedia information, and the insertion location region is region information corresponding to the bearing surface of the preset insertion entity.

Then, the insertion device selects an insertion location feature region from the insertion location region according to a preset flatness condition. That is, after obtaining the insertion location region, the insertion device acquires a region related to the inclination by removing a planar region from the insertion location region according to the preset flatness condition, that is, selects the insertion location feature region. Herein, the preset flatness condition means that flatness of the planar region is greater than flatness of the region related to the inclination. Herein, color block clustering may be performed on the insertion location region by using a preset color block clustering algorithm. After color block clustering, a corresponding planar region and the region related to the inclination are obtained.

Finally, the insertion device performs edge detection on the insertion location feature region to obtain the insertion location edge information. That is, after obtaining the insertion location feature region, the insertion device acquires edge information of the bearing surface of the preset insertion entity in the preset video frame to be inserted with information by using edge detection processing, that is, the insertion location edge information. Herein, edge detection may be performed on the insertion location feature region by using a preset edge detection algorithm, where the preset edge detection algorithm is an algorithm for edge detection, for example, a Laplacian edge detection algorithm, a Sobel edge detection algorithm, and a Canny (multi-stage) edge detection algorithm.

(c) Screen a feature contour point of each edge in the insertion location edge information according to a preset edge point threshold, to obtain at least one feature contour point combination.

In this embodiment of this disclosure, after the insertion device obtains the insertion location edge information, because the insertion location edge information is an edge point combination including pixels with obvious brightness changes, to improve accuracy of the edge point combination in representing edge points, the insertion device screens edge points in the insertion location edge information according to the preset edge point threshold. In addition, the insertion location edge information corresponds to at least one edge. Therefore, the insertion device uses an edge point whose feature contour point value is greater than the preset edge point threshold as a feature contour point for the feature contour point of each edge in the insertion location edge information, that is, obtains a feature contour point combination corresponding to each edge, so as to obtain at least one feature contour point combination corresponding to the insertion location edge information.

The preset edge point threshold is used for determining that the feature contour point is a reference threshold obtained through adaptive threshold learning, and may be a grayscale value or another feature value. This is not specifically limited in this embodiment of this disclosure.

(d) Respectively perform line fitting on the at least one feature contour point combination to obtain at least one piece of background fitted line information.

In this embodiment of this disclosure, after the at least one feature contour point combination is obtained, line fitting is performed on a basis of each feature contour point combination based on a preset line fitting algorithm, and one piece of background fitted line information is obtained for each feature contour point combination, so as to obtain the at least one piece of background fitted line information corresponding to the at least one feature contour point combination.

The preset line fitting algorithm is an algorithm for line fitting, for example, a random sample consensus (RANSAC) algorithm and a least squares method.

(e) Use at least one piece of slope information corresponding to the at least one piece of background fitted line information as the background inclination information.

In this embodiment of this disclosure, after obtaining the at least one piece of background fitted line information, the insertion device acquires a slope corresponding to each of the at least one piece of background fitted line information, that is, obtains at least one piece of slope information in a one-to-one correspondence with the at least one piece of background fitted line information. Herein, the at least one piece of slope information is the background inclination information.

Sub steps (a)-(e) describe an exemplary implementation process of acquiring the background inclination information, and a process of acquiring foreground inclination information corresponding to each piece of preset multimedia information is consistent with the implementation process of the background inclination information. In addition, one slope in the background inclination information is in a one-to-one correspondence with one slope in each piece of foreground inclination information, and a quantity of slopes in the background inclination information is equal to a quantity of slopes in each piece of foreground inclination information. Differently, because the at least one piece of preset multimedia information is a picture that includes only a multimedia object, information in the picture is the initial insertion location region corresponding to the preset insertion entity, and a step corresponding to sub step (a) does not need to be performed. However, if the at least one piece of preset multimedia information is not a picture that includes only a multimedia object, the step corresponding to sub step (a) needs to be performed, so as to determine the initial insertion location region corresponding to the preset insertion entity from the preset multimedia information. In addition, at least one piece of slope information of at least one piece of edge information corresponding to a bearing surface of the preset multimedia information forms the foreground inclination information. Herein, the preset multimedia information is picture information of the multimedia object.

In some embodiments, step S103 that the insertion device acquires the inclination difference between the background inclination information and the at least one piece of foreground inclination information to obtain the at least one piece of inclination difference information includes sub steps (a) and (b):

(a) Acquire a difference between each piece of slope information in the background inclination information and corresponding slope information in current foreground inclination information, to obtain at least one piece of slope difference information that corresponds to the current foreground inclination information and the background inclination information.

In this embodiment of this disclosure, one piece of slope information in the background inclination information is in a one-to-one correspondence with one piece of slope information in each piece of foreground inclination information, and a quantity of slope information in the background inclination information is equal to a quantity of slope information in each piece of foreground inclination information. Therefore, the insertion device uses each of the at least one piece of foreground inclination information as current foreground inclination information, and subtracts each piece of slope information in the background inclination information from corresponding slope information in the current foreground inclination information, to obtain a difference, that is, slope difference information that corresponds to each piece of slope information in the background inclination information and corresponding slope information in the current foreground inclination information, so as to obtain the at least one piece of slope difference information that corresponds to the current foreground inclination information and the background inclination information.

Herein, the current foreground inclination information is any foreground inclination information in the at least one piece of foreground inclination information, and one piece of slope information in the current foreground inclination information corresponds to one piece of slope information in the background inclination information.

(b) Acquire a product of the at least one piece of slope difference information to obtain inclination difference information that corresponds to the current foreground inclination information and the background inclination information, so as to obtain the at least one piece of inclination difference information that corresponds to the background inclination information and the at least one piece of foreground inclination information.

In this embodiment of this disclosure, after obtaining the at least one piece of slope difference information, the insertion device multiplies each of the at least one piece of slope difference information one by one, and an obtained result is inclination difference information that corresponds to the current foreground inclination information and the background inclination information. The current foreground inclination information is any foreground inclination information in the at least one piece of foreground inclination information. Therefore, after each of the at least one piece of foreground inclination information is used as the current foreground inclination information to obtain corresponding inclination difference information, the at least one piece of inclination difference information that corresponds to the background inclination information and the at least one piece of foreground inclination information is also obtained. For example, the inclination difference information between the current foreground inclination information and the background inclination information may be obtained by using formula (1):

$$\{\Pi_{j \in N_i} |\alpha_{bij} - \alpha_{fij}|\}_{M=i} \quad (1),$$

where M is a quantity of preset multimedia information in at least one piece of preset multimedia information, M=i is $i^{th}$ preset multimedia information, $N_t$ is a quantity of slope information in foreground inclination information corresponding to the $i^{th}$ preset multimedia information, j is a number of slope information, $\alpha_{fij}$ is $j^{th}$ slope information in the $i^{th}$ preset multimedia information, and $\alpha_{bij}$ is $j^{th}$ slope information that is in the preset insertion entity and that corresponds to the $j^{th}$ slope information in the $i^{th}$ preset multimedia information.

In some embodiments, another implementation step of acquiring the at least one piece of inclination difference information is further described. Therefore, S103 that the insertion device acquires the inclination difference between the background inclination information and the at least one piece of foreground inclination information to obtain the at least one piece of inclination difference information includes sub steps (c) and (d):

(c) Acquire a ratio of each piece of slope information in the background inclination information to corresponding slope information in current foreground inclination information, to obtain at least one piece of slope ratio information that corresponds to the current foreground inclination information and the background inclination information.

In this embodiment of this disclosure, the insertion device uses each of the at least one piece of foreground inclination information as the current foreground inclination information, and compares each piece of slope information in the background inclination information with corresponding slope information in the current foreground inclination information, to obtain a ratio, that is, slope ratio information that corresponds to each piece of slope information in the background inclination information and corresponding slope information in the current foreground inclination information, so as to obtain the at least one piece of slope ratio information that corresponds to the current foreground inclination information and the background inclination information.

Herein, the current foreground inclination information is any foreground inclination information in the at least one piece of foreground inclination information, and one piece of slope information in the current foreground inclination information corresponds to one piece of slope information in the background inclination information.

(d) Acquire a ratio of a sum of the at least one piece of slope ratio information to a quantity of the at least one piece of slope ratio information, to obtain inclination difference information that corresponds to the current foreground inclination information and the background inclination information, so as to obtain the at least one piece of inclination difference information that corresponds to the background inclination information and the at least one piece of foreground inclination information.

In this embodiment of this disclosure, after obtaining the at least one piece of slope ratio information, the insertion device calculates the ratio by using the sum of the at least one piece of slope ratio information as a numerator and using the quantity of slope ratio information corresponding to the at least one piece of slope ratio information as a denominator. The obtained ratio result is the inclination difference information that corresponds to the current foreground inclination information and the background inclination information. The current foreground inclination information is any foreground inclination information in the at least one piece of foreground inclination information. Therefore, after each of the at least one piece of foreground inclination information is used as the current foreground inclination information to obtain corresponding inclination difference information, the at least one piece of inclination difference information that corresponds to the background inclination information and the at least one piece of foreground inclination information is also obtained. For example, the inclination difference information between the current foreground inclination information and the background inclination information may be obtained by using formula (2):

$$\left\{ \frac{\sum_{j \in N_i} \frac{\alpha_{fij}}{\alpha_{bij}}}{N_i} \right\}_{M=i}, \quad (2)$$

where meanings of symbols in formula (2) are the same as meanings of symbols in formula (1).

Sub steps (a)-(b) and (c)-(d) respectively describe two different implementations of acquiring the at least one piece of inclination difference information.

In some embodiments, an implementation step of determining the preset video frame to be inserted with information from the preset video information is further included. Therefore, in step S101, before the insertion device acquires the background inclination information of the preset insertion entity in the preset video frame to be insertion with information, the information insertion method further includes steps S106-S109:

In step S106, when an information insertion request is received, the preset video information is acquired from a preset video library according to the information insertion request.

In this embodiment of this disclosure, when receiving the information insertion request for requesting to insert the multimedia object into the preset video information, in response to the information insertion request, the insertion device acquires a requested video name from the information insertion request, acquires a requested video identifier according to the requested video name, and further acquires corresponding preset video information from a preset video library according to the requested video identifier.

The preset video library refers to the database 502 that stores video information in FIG. 1. In addition, the insertion device may directly acquire the preset video information from the information insertion request. That is, the preset video information may be uploaded on a terminal side, and the terminal side generates an information insertion request including the preset video information. Therefore, the insertion device can directly obtain the preset video information from the information insertion request sent by the terminal.

In step S107, the preset video information is segmented by shots to obtain video shot information.

In this embodiment of this disclosure, after obtaining the preset video information, the insertion device segments the preset video information into video segments by shots according to a preset shot segmentation algorithm, where each video segment is one piece of shot information, so that video shot information corresponding to the preset video information is also obtained. Herein, the preset shot segmentation algorithm is a shot segmentation algorithm.

In step S108, insertion entity detection is performed on each video frame in each piece of shot information of the video shot information according to a preset insertion entity detection algorithm, to obtain the preset insertion entity and a target video shot combination in which the preset insertion entity is located.

In this embodiment of this disclosure, after the video shot information is obtained, for each video frame in each piece of shot information in the video shot information, insertion entity detection is performed according to the preset insertion entity detection algorithm. In this way, the preset insertion entity can be determined, and the target video shot combination in which the preset insertion entity is located can be determined. Herein, the insertion entity is a preset specified entity, for example, a table. The preset insertion entity belongs to an insertion entity. The target video shot combination is a set including shot information of an image corresponding to the preset insertion entity in at least one piece of shot information, and therefore, a quantity of shot information included in the target video shot combination is at least one.

In some embodiments, the step S108 that performs insertion entity detection on each video frame in each piece of shot information of the video shot information according to a preset insertion entity detection algorithm, to obtain the preset insertion entity and a target video shot combination in which the preset insertion entity is located includes sub steps (a)-(c):

(a) Perform insertion entity detection on each video frame in each piece of shot information of the video shot information according to the preset insertion entity detection algorithm, to obtain at least one insertion entity and at least one video shot combination to be inserted with information and in which the at least one insertion entity is located.

In this embodiment of this disclosure, when performing insertion entity detection on the video shot information, the insertion device can obtain, according to the video shot information, at least one insertion entity and at least one video shot combination to be inserted with information and in which the at least one insertion entity is located. For example, when the insertion entity is a table, at least one table and a video shot combination to be inserted with information and in which the at least one table is located can be detected. Herein, in the at least one video shot combination to be inserted with information, there is at least one piece of shot information included in each video shot combination to be inserted with information.

(b) Acquire at least one piece of time information corresponding to the at least one video shot combination to be inserted with information.

In this embodiment of this disclosure, after the insertion device obtains the at least one insertion entity and the at least one video shot combination to be inserted with information and in which the at least one insertion entity is located, because each piece of shot information corresponds to playback time information, the insertion device integrates (e.g., sums) a playback time information combination corresponding to each video shot combination to be inserted with information in the at least one video shot combination to be inserted with information to obtain corresponding time information, and for the at least one video shot combination to be inserted with information, obtains the corresponding at least one piece of time information.

(c) Determine the preset insertion entity from the at least one insertion entity according to the at least one piece of time information and preset insertion time information, and determine, from the at least one video shot combination to be inserted with information, the target video shot combination in which the preset insertion entity is located.

In this embodiment of this disclosure, after obtaining the at least one piece of time information, the insertion device may compare each piece of time information in the at least one piece of time information with the preset insertion time information, and in an insertion entity corresponding to time information that is greater than the preset insertion time information and that is in the at least one piece of time information, use any insertion entity as the preset insertion entity. In addition, the insertion device determines, from the at least one video shot combination to be inserted with information, the target video shot combination in which the preset insertion entity is located. An insertion entity corresponding to time information closest to the preset insertion time information in the at least one piece of time information may also be used as the preset insertion entity. In addition, the target video shot combination in which the preset insertion entity is located is determined from the at least one video shot combination to be inserted with information. This is not specifically limited in this embodiment of this disclosure.

For example, when the preset insertion time information is 10 seconds, the at least one piece of time information is 1 second, 5 seconds, 11 seconds, and 25 seconds, respectively. Because the time information 11 seconds is closest to the preset insertion time information 10 seconds, an insertion entity corresponding to the time information 11 seconds is the preset insertion entity, and a video shot combination to be inserted with information and in which the insertion entity corresponding to the time information 11 seconds is located is used as the target video shot combination in which the preset insertion entity is located.

In step S109, a video frame is selected from current video shot information to be inserted with information to obtain the preset video frame to be inserted with information.

In this embodiment of this disclosure, after obtaining the target video shot combination, the insertion device uses each piece of shot information in the target video shot combination as current video shot information to be inserted with information, and uses any video frame in the current video shot information to be inserted with information as the preset video frame to be inserted with information.

The current video shot information to be inserted with information is any shot information in the target video shot combination.

In some embodiments, an implementation process of obtaining the target video information based on the target video frame is further included. Therefore, after step S105 that the insertion device inserts the target multimedia information onto the bearing surface of the preset insertion entity of the preset video frame to be inserted with information to obtain the target video frame, the information insertion method further includes steps S110-S112.

In step S110, insertion of the target multimedia information into the current video shot information to be inserted with information according to the target video frame is completed, to obtain video shot information inserted with information, until insertion of the target multimedia information into each piece of shot information in the target video shot combination is completed, to obtain a video shot combination inserted with information.

In this embodiment of this disclosure, after the insertion device completes insertion of the target multimedia information into the preset video frame to be inserted with information, a similar method may be used for each video frame in the current video shot information to be inserted with information to complete insertion of the target multimedia information into the current video shot information to be inserted with information. Alternatively, insertion of the target multimedia information into the current video shot information to be inserted with information may be completed according to an offset between bearing locations in frames of the current video shot information to be inserted with information. This embodiment of this disclosure sets no specific limitation. Herein, the video shot information inserted with information is the current video shot information inserted with the target multimedia information.

Herein, after completing insertion of the target multimedia information into any shot information in the target video shot combination, the insertion device obtains the video shot combination inserted with information inserted with the target multimedia information.

In step S111, a video shot combination not inserted with information from the video shot information is acquired according to the video shot combination inserted with information.

In this embodiment of this disclosure, after the insertion device obtains the video shot combination inserted with information, the video shot combination inserted with information is a combination including shot information obtained after the target multimedia information is inserted into the video shot information. Therefore, the insertion device obtains, from the video shot information, remaining shot information other than the shot information corresponding to the at least one piece of target video shot information, that is, the video shot combination not inserted with information. Herein, the video shot combination not inserted with information is remaining shot information other than the target video shot combination in the video shot information.

In step S112, video fusion is performed on the video shot combination inserted with information and the video shot combination not inserted with information to obtain target video information.

In this embodiment of this disclosure, after the video shot combination inserted with information and the video shot combination not inserted with information are obtained, video fusion is performed on the video shot combination inserted with information and the video shot combination not inserted with information based on a connection relationship between shot information in the video shot information, and the target video information is obtained.

In some embodiments, the target video information may alternatively be obtained by replacing the corresponding shot information in the video shot information with at least one video shot combination inserted with information.

In some embodiments, the step S110 that the insertion device completes insertion of the target multimedia information into the current video shot information to be inserted with information according to the target video frame, to obtain video shot information inserted with information includes sub steps (a)-(d):

(a) Determine a motion reference object from the preset video frame to be inserted with information, the motion reference object being an object on the bearing surface of the preset insertion entity.

In this embodiment of this disclosure, the bearing surface of the preset insertion entity in the preset video frame to be inserted with information carries at least one object, such as a cup on a desktop. Therefore, the insertion device selects an object from the at least one object as a reference object of a location offset between frames in the current video shot information to be inserted with information or between frames in the current video shot information to be inserted with information and a reference video frame, that is, as a motion reference object. Herein, the reference video frame may be the preset video frame to be inserted with information, and the motion reference object is an object on the bearing surface of the preset insertion entity.

(b) Acquire motion track information of the motion reference object in the current video shot information to be inserted with information.

In this embodiment of this disclosure, after the motion reference object is determined, a location offset between frames in the current video shot information to be inserted with information or between frames in the current video shot information to be inserted with information and the reference video frame is obtained, so that the motion track information is obtained.

(c) Determine at least one target bearing location of the target multimedia information in at least one video frame not inserted with information according to the motion track information.

In this embodiment of this disclosure, after obtaining the motion track information of the motion reference object, the insertion device also determines the location offset of the motion reference object between the frames in the current video shot information to be inserted with information or between the frames in the current video shot information to be inserted with information and the reference video frame. Therefore, the location offset of the target multimedia information between the frames in the current video shot information to be inserted with information or between the frames in the current video shot information to be inserted with information and the reference video frame is obtained. In this case, the at least one target bearing location corresponding to the target multimedia information on the bearing surface of the preset insertion entity of the at least one video frame not inserted with information can also be determined based on the location offset of the target multimedia information between the frames in the current video shot information to be inserted with information or between the frames in the current video shot information to be inserted with information and the reference video frame. Herein, the at least one video frame not inserted with information is a remaining video frame other than the preset video frame to be inserted with information in the current video shot information to be inserted with information.

(d) Insert the target multimedia information onto the bearing surface of the preset insertion entity of the at least one video frame not inserted with information based on the at least one target bearing location, to obtain the video shot information inserted with information.

In this embodiment of this disclosure, after the at least one target bearing location is obtained, the insertion location of the target multimedia information on the bearing surface of the preset insertion entity in the at least one video frame not inserted with information is determined, and the target multimedia information is inserted at a location on the bearing surface of the preset insertion entity in the at least one video frame not inserted with information, so that the video shot information inserted with information is obtained.

In some embodiments, an implementation process of performing application according to the target video information is further included. Therefore, after the step S112 that the insertion device performs video fusion on the at least one video shot combination inserted with information and the at least one video shot combination not inserted with information to obtain the target video information, the information insertion method further includes step S113.

In step S113, when a video loading request is received, the target video information is played by using a playback device according to the video loading request.

In this embodiment of this disclosure, when a user requests to view the target video information, a video loading request can be correspondingly received, and the target video information is played in response to the video loading request. The target video information may be played by using the playback device.

Figure 5:
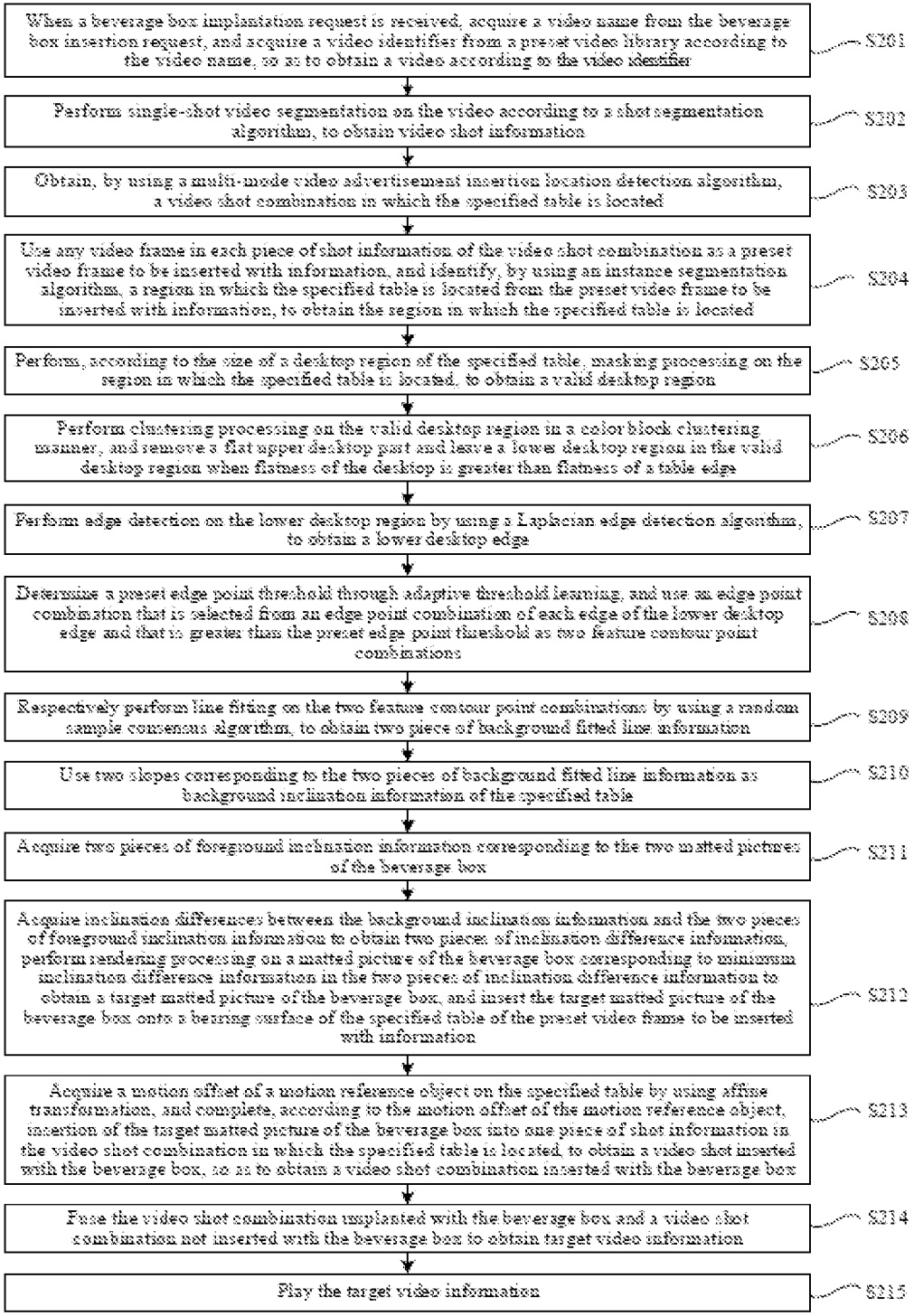
FIG. 5 is a schematic flowchart of an exemplary information insertion method according to an embodiment of this disclosure.

The following describes an exemplary application of this embodiment of this disclosure in an actual application scenario. In this exemplary application scenario, a preset insertion entity is a specified table, and at least one piece of multimedia information is two matted pictures of a beverage box at different angles corresponding to the beverage box. As shown in FIG. 5, steps are as follows:

In step S201, when a beverage box insertion request is received, a video name is acquired from the beverage box insertion request, and a video identifier from a preset video library is acquired according to the video name, so as to obtain a video (e.g., a video stream or source file) according to the video identifier.

The beverage box insertion request is an information insertion request, and the video stream source file is preset video information.

In step S202, single-shot video segmentation is performed on the video according to a shot segmentation algorithm, to obtain video shot information.

In step S203, by using a multi-mode video advertisement insertion location detection algorithm, a video shot combination in which the specified table is located.

The multi-mode video advertisement insertion location detection algorithm is a preset insertion entity detection algorithm, and the video shot combination is a target video shot combination. In addition, if it is determined to perform information insertion on a wall, a video shot combination in which the wall is located is obtained. If it is determined to perform information insertion on a photo frame, a video shot combination in which the photo frame is located is obtained.

In step S204, any video frame is used in each piece of shot information of the video shot combination as a preset video frame to be inserted with information, and a region in which the specified table is located is identified, by using an instance segmentation algorithm, from the preset video frame to be inserted with information, to obtain the region in which the specified table is located.

Herein, the region in which the specified table is located is an initial insertion location region.

In step S205, masking processing is performed, according to the size of a desktop region of the specified table, on the region in which the specified table is located, to obtain a valid desktop region.

Herein, the size of the desktop region of the specified table is a preset region feature, and the valid desktop region is an insertion location region. As shown in block a in FIG. 6, a preset video frame to be inserted with information is shown, and the preset video frame to be inserted with information includes the preset insertion entity, in this example the specified table. The valid desktop region is shown in block b in FIG. 6.

In step S206, clustering processing is performed on the valid desktop region in a color block clustering manner, and a flat upper desktop part is removed and a lower desktop region is left in the valid desktop region when flatness of the desktop is greater than flatness of a table edge.

Because background inclination information of the specified table that needs to be acquired is an inclination of the lower desktop edge, the flat upper desktop part is not included in calculation, and only the lower desktop region needs to be calculated. Herein, that the flatness of the desktop is greater than the flatness of the table edge is a preset flatness condition, and the lower desktop region is an insertion location feature region. The lower desktop region is shown in block c in FIG. 6.

In step S207, edge detection is performed on the lower desktop region by using a Laplacian edge detection algorithm, to obtain a lower desktop edge.

Herein, the Laplacian edge detection algorithm is a preset edge detection algorithm, and the lower desktop edge is insertion location edge information.

Figure 6:
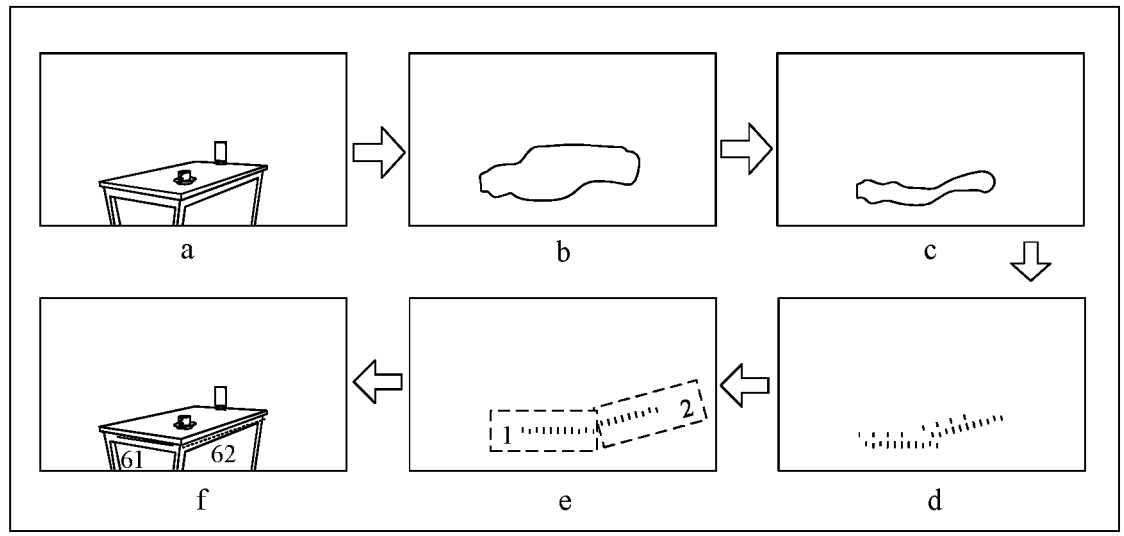
FIG. 6 is a schematic diagram of an example of acquiring background inclination information according to an embodiment of this disclosure.

The lower desktop edge is shown in block d in FIG. 6.

In step S208, a preset edge point threshold is determined through adaptive threshold learning, and an edge point combination is used that is selected from an edge point combination of each edge of the lower desktop edge and that is greater than the preset edge point threshold as two feature contour point combinations.

As shown in block e in FIG. 6, the two feature contour point combinations are edge points included in region 1 and edge points included in region 2, and the two feature contour point combinations refer to at least one feature contour point combination.

In step S209, line fitting is respectively performed on the two feature contour point combinations by using a random sample consensus algorithm, to obtain two pieces of background fitted line information.

The random sample consensus algorithm is a preset line fitting algorithm, and the two pieces of background fitted line information are shown in formula (3):

$$y_1=\alpha_1 x_1+\beta_1, y_2=\alpha_2 x_2+\beta_2 \quad (3),$$

where $y_1$ and $y_2$ are dependent variables, $x_1$ and $x_2$ are independent variables, $\alpha_1$ and $\alpha_2$ are two slopes corresponding to the two pieces of background fitted line information, and $\beta_1$ and $\beta_2$ are constants. Formula (3) herein is also referred to as a modeled representation of background inclination information.

As shown in block f in FIG. 6, background fitted line information corresponding to two fitted edges 61 and 62 is shown.

In step S210, two slopes corresponding to the two pieces of background fitted line information are used as background inclination information of the specified table.

In step S21, two pieces of foreground inclination information corresponding to the two matted pictures of the beverage box are acquired.

The step of acquiring the two pieces of foreground inclination information corresponding to the two matted pictures of the beverage box is similar to the foregoing step of acquiring the background inclination information. In addition, each matted picture of the beverage box corresponds to two pieces of slope information, and the two pieces of slope information corresponding to the matted picture of the beverage box are in a one-to-one correspondence with the two pieces of slope information of the specified table.

Figure 7:
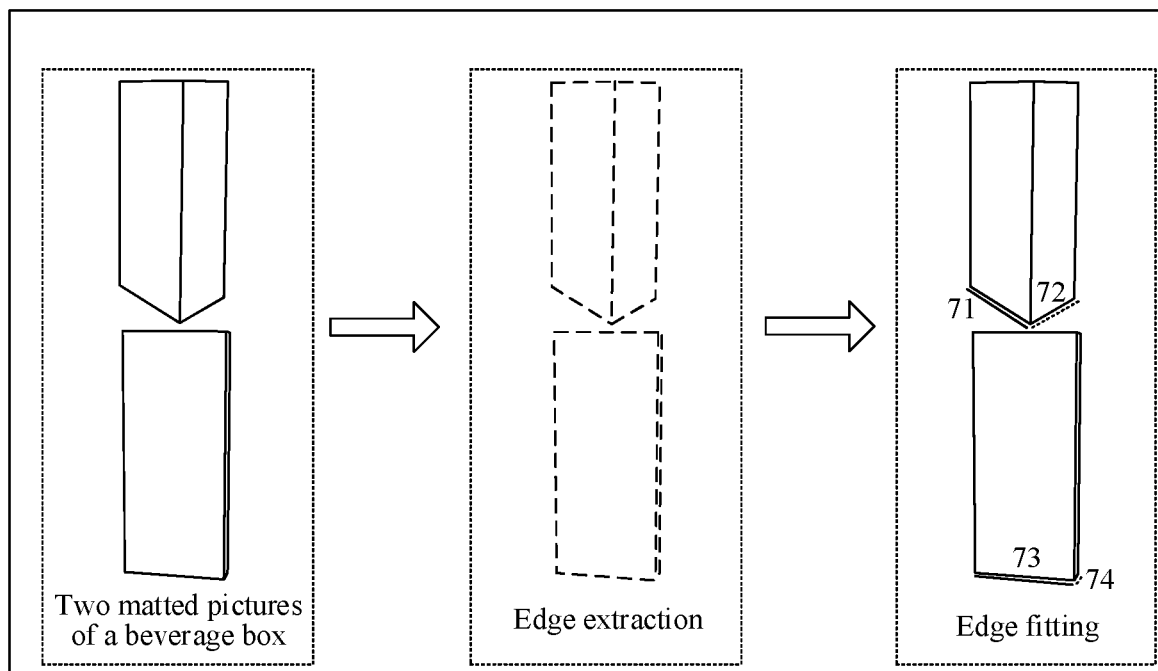
FIG. 7 is a schematic diagram of an example of acquiring foreground inclination information according to an embodiment of this disclosure.

FIG. 7 shows two pieces of foreground inclination information obtained through edge extraction and edge fitting. One piece of foreground inclination information corresponding to each matted picture of the beverage box includes two slopes, which are respectively a slope corresponding to edge 71 and a slope corresponding to edge 72, and a slope corresponding to edge 73 and a slope corresponding to edge 74. In addition, both edge 71 and edge 73 correspond to edge 61 in FIG. 6, and both edge 72 and edge 74 correspond to edge 62 in FIG. 6.

In step S212, inclination differences between the background inclination information and the two pieces of foreground inclination information are acquired to obtain two pieces of inclination difference information, rendering processing is performed on a matted picture of the beverage box corresponding to minimum inclination difference information in the two pieces of inclination difference information to obtain a target matted picture of the beverage box, and the target matted picture of the beverage box is inserted onto a bearing surface of the specified table of the preset video frame to be inserted with information.

Figure 8:
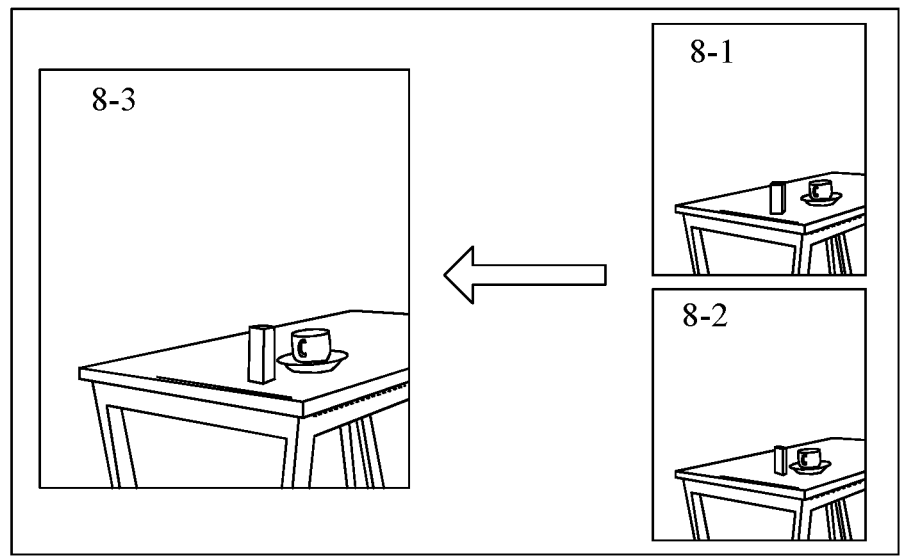
FIG. 8 is a schematic diagram of an example of determining minimum inclination difference information according to an embodiment of this disclosure.

The minimum inclination difference information can be obtained by selecting the minimum inclination difference information from the two pieces of inclination difference information. As shown in FIG. 8, 8-1 shows one matted picture of the beverage box in the two matted pictures of the beverage box, and shows a schematic scenario of acquiring the inclination difference information corresponding to the specified table; and 8-2 shows the other matted picture of the beverage box in the two matted pictures of the beverage box, and shows a schematic scenario of acquiring the inclination difference information corresponding to the specified table. A selection result 8-3 is obtained through selection. It is easy to learn that, 8-3 corresponds to a schematic scenario corresponding to the minimum inclination difference information.

In step S213, a motion offset of a motion reference object (e.g., a cup) on the specified table is acquired by using affine transformation, and insertion of the target matted picture of the beverage box is completed into one piece of shot information in the video shot combination in which the specified table is located according to the motion offset of the motion reference object, to obtain a video shot inserted with the beverage box, so as to obtain a video shot combination inserted with the beverage box.

Herein, the video shot inserted with the beverage box is a target video shot, and the video shot combination inserted with the beverage box is a video shot combination inserted with information.

In step S214, the video shot combination inserted with the beverage box and a video shot combination not inserted with the beverage box are fused to obtain target video information.

Herein, the video shot combination not inserted with the beverage box is a video shot combination not inserted with information.

In step S215, the target video information is played.

Figure 9:
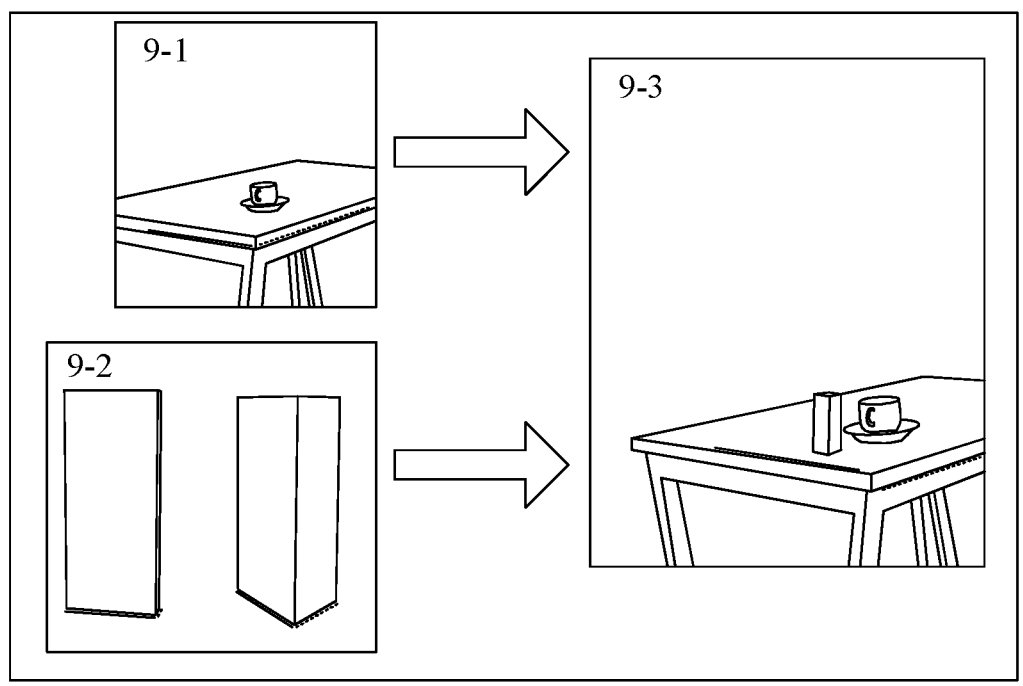
FIG. 9 is a schematic diagram of an example of determining a target video frame according to an embodiment of this disclosure.

In the foregoing exemplary application, lower edge line fitting is first performed on the specified table, as shown in 9-1 in FIG. 9, and then lower edge fitting 9-2 is performed on a physical object (the two matted pictures of the beverage box). Further, with reference to a lower edge line fitting result of each of 9-1 and 9-2, an edge line slope difference is calculated, and finally, an orientation selection result 9-3 is obtained according to a calculation result, where 9-3 refers to the target video frame.

Figure 10:
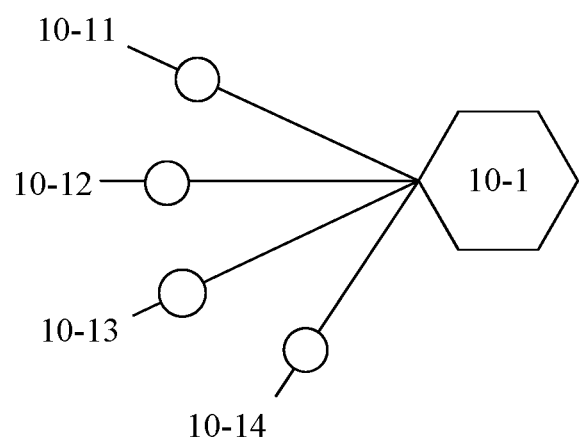
FIG. 10 is a schematic diagram of an exemplary beneficial effect analysis according to an embodiment of this disclosure.
Figure 11:
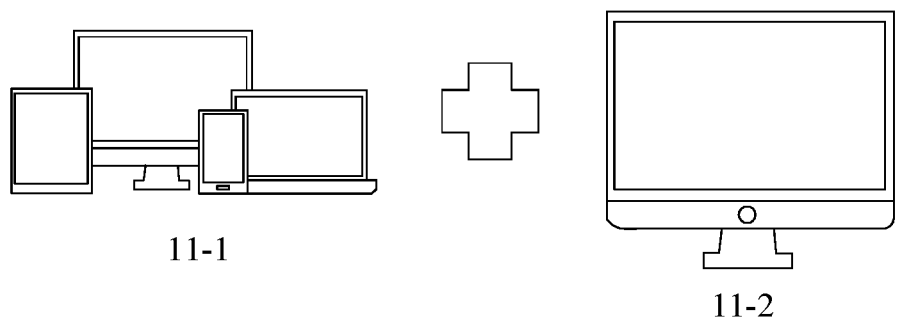
FIG. 11 is an exemplary information insertion system architecture according to an embodiment of this disclosure.

It may be understood that, by using the information insertion method provided in this embodiment of this disclosure, manual determining of the target multimedia information by a designer can be replaced, thereby reducing labor costs; in addition, compared with manually determining the target multimedia information by the designer, duration can be reduced from 30 minutes to 1 minute, thereby reducing time costs. In addition, the information insertion method provided in this embodiment of this disclosure is applied to an advertisement insertion scenario. Beneficial effects corresponding to advertisement insertion are shown in 10-1 of FIG. 10. Firstly, an advertisement form cannot be skipped and is visible to a VIP, so that a reach rate is high (10-11). Secondly, an advertiser does not need to highly depend on popularity of programming, and the risk of advertisement expenditure is low (10-12). Thirdly, an inserted advertisement is delivered by population, and a budget cost is low (10-13). Fourthly, value information is high for a video provider (10-14). In addition, in an information insertion system architecture shown in FIG. 11, information insertion is implemented by integrating a video platform 11-1 and an advertisement system 11-2, and an obtained insertion advertisement is a trend of advertisement development. The video platform 11-1 refers to an example of a system including the terminal 201, the database 202, and the video server 200 in FIG. 2, and the advertisement system 11-2 refers to an example of a system including the terminal 301, the database 302, and the multimedia server 300 in FIG. 2.

The following continues to describe an exemplary structure when the information insertion apparatus 555 provided in the embodiment of this disclosure is implemented as software modules. In some embodiments, as shown in FIG. 3, software modules of the information insertion apparatus 555 that are stored in the memory 550 may include a background inclination acquiring part 5551, a foreground inclination acquiring part 5552, an inclination difference acquiring part 5553, a target determining part 5554, and an insertion part 5555. One or more of modules, submodules, units, and/or parts of the apparatus can be implemented by processing circuitry, software, or a combination thereof, for example.

The background inclination acquiring part 5551 is configured to acquire background inclination information of a preset insertion entity in a preset video frame to be insertion with information, the preset video frame to be inserted with information being a minimum unit for inserting multimedia information in preset video information, and the background inclination information being inclination information of a bearing surface of the preset insertion entity in the preset video frame to be inserted with information.

The foreground inclination acquiring part 5552 is configured to acquire at least one piece of foreground inclination information corresponding to at least one piece of preset multimedia information, each of the at least one piece of foreground inclination information being inclination information of a to-be-contacted surface of corresponding preset multimedia information.

The inclination difference acquiring part 5553 is configured to acquire an inclination difference between the background inclination information and the at least one piece of foreground inclination information, to obtain at least one piece of inclination difference information.

The target determining part 5554 is configured to determine, from the at least one piece of preset multimedia information according to the at least one piece of inclination difference information, target multimedia information that meets a preset inclination difference condition.

The insertion part 5555 is configured to insert the target multimedia information onto the bearing surface of the preset insertion entity of the preset video frame to be inserted with information to obtain a target video frame.

In an implementation of this embodiment of this disclosure, the background inclination acquiring part 5551 includes an identification part 5551-1, an edge acquiring part 5551-2, a contour point screening part 5551-3, a line fitting part 5551-4, and a slope acquiring part 5551-5.

The identification part 5551-1 is configured to identify, in the preset video frame to be inserted with information, a region in which the preset insertion entity is located, to obtain a corresponding initial insertion location region;

The edge acquiring part 5551-2 is configured to acquire insertion location edge information of the initial insertion location region;

The contour point screening part 5551-3 is configured to screen a feature contour point of each edge in the insertion location edge information according to a preset edge point threshold, to obtain at least one feature contour point combination;

The line fitting part 5551-4 is configured to respectively perform line fitting on the at least one feature contour point combination to obtain at least one piece of background fitted line information.

The slope acquiring part 5551-5 is configured to use at least one piece of slope information corresponding to the at least one piece of background fitted line information as the background inclination information.

In an implementation of this embodiment of this disclosure, the edge acquiring part 5551-2 is further configured to: select an insertion location region from the initial insertion location region according to a preset region feature; select an insertion location feature region from the insertion location region according to a preset flatness condition; and perform edge detection on the insertion location feature region to obtain the insertion location edge information.

In an implementation of this embodiment of this disclosure, the inclination difference acquiring part 5553 is further configured to: acquire a difference between each piece of slope information in the background inclination information and corresponding slope information in current foreground inclination information, to obtain at least one piece of slope difference information that corresponds to the current foreground inclination information and the background inclination information, the current foreground inclination information being any one of the at least one piece of foreground inclination information, and one piece of slope information in the current foreground inclination information being corresponding to one piece of slope information in the background inclination information; and acquire a product of the at least one piece of slope difference information to obtain inclination difference information that corresponds to the current foreground inclination information and the background inclination information, so as to obtain the at least one piece of inclination difference information that corresponds to the background inclination information and the at least one piece of foreground inclination information.

In an implementation of this embodiment of this disclosure, the inclination difference acquiring part 5553 is further configured to: acquire a ratio of each piece of slope information in the background inclination information to corresponding slope information in current foreground inclination information, to obtain at least one piece of slope ratio information that corresponds to the current foreground inclination information and the background inclination information; and acquire a ratio of a sum of the at least one piece of slope ratio information to a quantity of the at least one piece of slope ratio information, to obtain inclination difference information that corresponds to the current foreground inclination information and the background inclination information, so as to obtain the at least one piece of inclination difference information that corresponds to the background inclination information and the at least one piece of foreground inclination information.

In an implementation of this embodiment of this disclosure, the information insertion apparatus 555 further includes a video frame determining part 5556, and the video frame determining part 5556 is configured to: acquire, when an information insertion request is received, the preset video information from a preset video library according to the information insertion request; segment the preset video information by shots to obtain video shot information; perform insertion entity detection on each video frame in each piece of shot information of the video shot information according to a preset insertion entity detection algorithm, to obtain the preset insertion entity and a target video shot combination in which the preset insertion entity is located; and select a video frame from current video shot information to be inserted with information to obtain the preset video frame to be inserted with information, the current video shot information to be inserted with information being any shot information in the target video shot combination.

In an implementation of this embodiment of this disclosure, the video frame determining part 5556 is further configured to: perform insertion entity detection on each video frame in each piece of shot information of the video shot information according to the preset insertion entity detection algorithm, to obtain at least one insertion entity and at least one video shot combination to be inserted with information and in which the at least one insertion entity is located; acquire at least one piece of time information corresponding to the at least one video shot combination to be inserted with information; and determine the preset insertion entity from the at least one insertion entity according to the at least one piece of time information and preset insertion time information, and determine, from the at least one video shot combination to be inserted with information, the target video shot combination in which the preset insertion entity is located.

In an implementation of this embodiment of this disclosure, the information insertion apparatus 555 further includes a video fusion part 5557, and the video fusion part 5557 is configured to: complete insertion of the target multimedia information into the current video shot information to be inserted with information according to the target video frame, to obtain video shot information inserted with information, until insertion of the target multimedia information into each piece of shot information in the target video shot combination is completed, to obtain a video shot combination inserted with information; acquire a video shot combination not inserted with information from the video shot information according to the video shot combination inserted with information, the video shot combination not inserted with information being remaining shot information other than the target video combination in the video shot information; and perform video fusion on the video shot combination inserted with information and the video shot combination not inserted with information to obtain target video information.

In an implementation of this embodiment of this disclosure, the video fusion part 5557 is further configured to: determine a motion reference object from the preset video frame to be inserted with information, the motion reference object being an object on the bearing surface of the preset insertion entity; acquire motion track information of the motion reference object in the current video shot information to be inserted with information; determine at least one target bearing location of the target multimedia information in at least one video frame not inserted with information according to the motion track information, the at least one video frame not inserted with information being a remaining video frame other than the preset video frame to be inserted with information in the current video shot information to be inserted with information; and insert the target multimedia information onto the bearing surface of the preset insertion entity of the at least one video frame not inserted with information based on the at least one target bearing location, to obtain the video shot information inserted with information.

In an implementation of this embodiment of this disclosure, the target determining part 5554 is further configured to: select minimum inclination difference information from the at least one piece of inclination difference information according to the preset inclination difference condition; determine preset multimedia information corresponding to the minimum inclination difference information from the at least one piece of preset multimedia information, to obtain initial target multimedia information; and perform rendering processing on the initial target multimedia information according to the preset video frame to be inserted with information, to obtain the target multimedia information.

In an implementation of this embodiment of this disclosure, the information insertion apparatus 555 further includes a video playback part 5558, and the video playback part 5558 is configured to play, when a video loading request is received, the target video information by using a playback device according to the video loading request.

When the integrated part according to this embodiment of this disclosure is implemented in the form of a software functional part and sold or used as an independent product, the integrated unit may be stored in a computer storage medium. Based on such an understanding, a person skilled in the art can understand that the embodiments of this disclosure may be provided as a method, a system, or a computer program product. Therefore, this disclosure may use a form of hardware-only embodiments, software-only embodiments, or embodiments combining software and hardware. In addition, the embodiments of this disclosure may adopt one or more forms of computer program products implemented on a computer storage medium including computer executable instructions. The computer storage medium includes a universal serial bus (USB), a removable hard disk, a read-only memory (ROM), a random access memory (RAM), a magnetic disk memory, a CD-ROM, an optical memory, and the like.

An embodiment of this disclosure further provides a computer storage medium, such as a non-transitory computer-readable storage medium, that stores a computer executable instruction, and the computer executable instruction is executed by a processor to implement the information insertion method in the embodiment of this disclosure.

In some embodiments, the executable instructions can be written in a form of a program, software, a software module, a script, or code and according to a programming language (including a compiler or interpreter language or a declarative or procedural language) in any form, and may be deployed in any form, including an independent program or a module, a component, a subroutine, or another unit suitable for use in a computing environment.

In an example, the executable instructions may, but do not necessarily, correspond to a file in a file system, and may be stored in a part of a file that saves another program or other data, for example, be stored in one or more scripts in a hypertext markup language (HTML) file, stored in a file that is specially used for a program in discussion, or stored in the plurality of collaborative files (e.g., be stored in files of one or more parts, subprograms, or code parts).

In an example, the executable instructions can be deployed for execution on one computing device, execution on a plurality of computing devices located at one location, or execution on a plurality of computing devices that are distributed at a plurality of locations and that are interconnected through a communication network.

In conclusion, in the embodiments of this disclosure, corresponding inclination difference information is obtained by comparing background inclination information of a preset insertion entity in a preset video frame to be inserted with information and foreground inclination information of each piece of preset multimedia information, so as to determine, from at least one piece of preset multimedia information according to the inclination difference information, target multimedia information having the highest degree of adaptation to the preset video frame to be inserted with information, thereby implementing a process of automatically selecting target multimedia information having a high degree of adaptation. Therefore, when multimedia information insertion is completed according to the target multimedia information, multimedia information can be intelligently inserted into the video frame. In this way, intelligence of multimedia information insertion can be improved.

The foregoing descriptions are merely embodiments of this disclosure and are not intended to limit the protection scope of this disclosure. Any modification, equivalent replacement, or improvement made without departing from the spirit and principle of this disclosure shall fall within the protection scope of this disclosure.

INDUSTRIAL PRACTICABILITY

In the embodiments of this disclosure, corresponding inclination difference information is obtained by comparing background inclination information of a preset insertion entity in a preset video frame to be inserted with information and foreground inclination information of each piece of preset multimedia information, so as to determine, from at least one piece of preset multimedia information according to the inclination difference information, target multimedia information having the highest degree of adaptation to the preset video frame to be inserted with information, thereby implementing a process of automatically selecting target multimedia information having a high degree of adaptation. Therefore, when multimedia information insertion is completed according to the target multimedia information, multimedia information can be intelligently inserted into the video frame. In this way, intelligence of multimedia information insertion can be improved.

What is claimed is:

1. An information insertion method, the method comprising:
   acquiring background inclination information of a preset entity in a video frame to be inserted with information, the background inclination information being of a bearing surface of the preset entity in the video frame;
   acquiring at least one piece of foreground inclination information corresponding to at least one piece of multimedia information, each of the at least one piece of foreground inclination information being of a to-be-contacted surface of the corresponding multimedia information;
   acquiring an inclination difference between the background inclination information and each of the at least one piece of foreground inclination information, to obtain at least one piece of inclination difference information;
   determining, from the at least one piece of multimedia information according to the at least one piece of inclination difference information, target multimedia information that meets an inclination difference condition; and
   inserting, by processing circuitry, the target multimedia information onto the bearing surface of the preset entity of the video frame to obtain a target video frame.

2. The method according to claim 1, wherein the acquiring the background inclination information comprises:
   identifying, in the video frame, a region in which the preset entity is located, to obtain an initial insertion location region;
   acquiring insertion location edge information of the initial insertion location region;
   screening a feature contour point of each edge in the insertion location edge information according to an edge point threshold, to obtain at least one feature contour point combination;
   respectively performing line fitting on the at least one feature contour point combination to obtain at least one piece of background fitted line information; and
   determining at least one piece of slope information corresponding to the at least one piece of background fitted line information as the background inclination information.

3. The method according to claim 2, wherein the acquiring the insertion location edge information comprises:
- selecting an insertion location region from the initial insertion location region according to a region feature;
- selecting an insertion location feature region from the insertion location region according to a flatness condition; and
- performing edge detection on the insertion location feature region to obtain the insertion location edge information.

4. The method according to claim 1, wherein the acquiring the inclination difference comprises:
- acquiring a difference between each piece of slope information in the background inclination information and corresponding slope information in a piece of the foreground inclination information, to obtain at least one piece of slope difference information that corresponds to the piece of the foreground inclination information and the background inclination information, the piece of foreground inclination information being any one of the at least one piece of foreground inclination information, and one piece of the slope information in the piece of the foreground inclination information corresponding to one piece of the slope information in the background inclination information; and
- acquiring a product of the at least one piece of the slope difference information to obtain inclination difference information that corresponds to the one piece of the foreground inclination information and the background inclination information, so as to obtain the at least one piece of inclination difference information that corresponds to the background inclination information and the at least one piece of foreground inclination information.

5. The method according to claim 1, wherein the acquiring the inclination difference comprises:
- acquiring a ratio of each piece of slope information in the background inclination information to corresponding slope information in a piece of the foreground inclination information, to obtain at least one piece of slope ratio information that corresponds to the piece of the foreground inclination information and the background inclination information; and
- acquiring a ratio of a sum of the at least one piece of slope ratio information to a quantity of the at least one piece of slope ratio information, to obtain inclination difference information that corresponds to the piece of the foreground inclination information and the background inclination information, so as to obtain the at least one piece of inclination difference information that corresponds to the background inclination information and the at least one piece of foreground inclination information.

6. The method according to claim 1, wherein before the acquiring the background inclination information, the method further comprises:
- acquiring, when an information insertion request is received, a video according to the information insertion request;
- segmenting the video into shots to obtain video shot information;
- performing insertion entity detection on each video frame in each piece of shot information of the video shot information according to an insertion entity detection algorithm, to obtain the preset entity and a target video shot combination in which the preset entity is located; and
- selecting the video frame from the video shot information to be inserted with the information, the video shot information to be inserted with the information being any shot information in the target video shot combination.

7. The method according to claim 6, wherein the performing insertion entity detection comprises:
- performing insertion entity detection on each video frame in each piece of shot information of the video shot information according to the insertion entity detection algorithm, to obtain at least one insertion entity and at least one video shot combination to be inserted with the information and in which the at least one insertion entity is located;
- acquiring at least one piece of time information corresponding to the at least one video shot combination to be inserted with the information;
- determining the preset entity from the at least one insertion entity according to the at least one piece of time information and insertion time information; and
- determining, from the at least one video shot combination to be inserted with the information, the target video shot combination in which the preset entity is located.

8. The method according to claim 6, wherein after the inserting the target multimedia information, the method further comprises:
- completing the insertion of the target multimedia information into the video shot information to be inserted with the information according to the target video frame, to obtain video shot information inserted with the information, until the insertion of the target multimedia information into each piece of shot information in the target video shot combination is completed, to obtain a video shot combination inserted with the information;
- acquiring a video shot combination not inserted with the information from the video shot information according to the video shot combination inserted with the information, the video shot combination not inserted with the information being remaining shot information other than the target video shot combination in the video shot information; and
- performing video fusion on the video shot combination inserted with the information and the video shot combination not inserted with the information to obtain target video information.

9. The method according to claim 8, wherein the completing the insertion of the target multimedia information comprises:
- determining a motion reference object from the video frame to be inserted with the information, the motion reference object being an object on the bearing surface of the preset entity;
- acquiring motion track information of the motion reference object in the video shot information to be inserted with the information;
- determining at least one target bearing location of the target multimedia information in at least one video frame not inserted with the information according to the motion track information, the at least one video frame not inserted with the information being a remaining video frame other than the video frame to be inserted with the information in the video shot information to be inserted with the information; and
- inserting the target multimedia information onto the bearing surface of the preset entity of the at least one video frame not inserted with the information based on the at least one target bearing location, to obtain the video shot information inserted with the information.

10. The method according to claim 8, wherein after the performing the video fusion, the method further comprises:
playing the target video information by a playback device according to a video loading request.

11. The method according to claim 1, wherein the determining the target multimedia information comprises:
selecting minimum inclination difference information from the at least one piece of inclination difference information according to the inclination difference condition;
determining multimedia information corresponding to the minimum inclination difference information from the at least one piece of multimedia information, to obtain initial target multimedia information; and
performing rendering processing on the initial target multimedia information according to the video frame to be inserted with the information, to obtain the target multimedia information.

12. An information insertion apparatus, comprising:
processing circuitry configured to:
acquire background inclination information of a preset entity in a video frame to be inserted with information, the background inclination information being of a bearing surface of the preset entity in the video frame;
acquire at least one piece of foreground inclination information corresponding to at least one piece of multimedia information, each of the at least one piece of foreground inclination information being of a to-be-contacted surface of the corresponding multimedia information;
acquire an inclination difference between the background inclination information and each of the at least one piece of foreground inclination information, to obtain at least one piece of inclination difference information;
determine, from the at least one piece of multimedia information according to the at least one piece of inclination difference information, target multimedia information that meets an inclination difference condition; and
insert the target multimedia information onto the bearing surface of the preset entity of the video frame to obtain a target video frame.

13. The information insertion apparatus according to claim 12, wherein the processing circuitry is configured to:
identify, in the video frame, a region in which the preset entity is located, to obtain an initial insertion location region;
acquire insertion location edge information of the initial insertion location region;
screen a feature contour point of each edge in the insertion location edge information according to an edge point threshold, to obtain at least one feature contour point combination;
respectively perform line fitting on the at least one feature contour point combination to obtain at least one piece of background fitted line information; and
determine at least one piece of slope information corresponding to the at least one piece of background fitted line information as the background inclination information.

14. The information insertion apparatus according to claim 13, wherein the processing circuitry is configured to:
select an insertion location region from the initial insertion location region according to a region feature;
select an insertion location feature region from the insertion location region according to a flatness condition; and
performing edge detection on the insertion location feature region to obtain the insertion location edge information.

15. The information insertion apparatus according to claim 12, wherein the processing circuitry is configured to:
acquire a difference between each piece of slope information in the background inclination information and corresponding slope information in a piece of the foreground inclination information, to obtain at least one piece of slope difference information that corresponds to the piece of the foreground inclination information and the background inclination information,
the piece of foreground inclination information being any one of the at least one piece of foreground inclination information, and one piece of the slope information in the piece of the foreground inclination information corresponding to one piece of the slope information in the background inclination information; and
acquire a product of the at least one piece of the slope difference information to obtain inclination difference information that corresponds to the one piece of the foreground inclination information and the background inclination information, so as to obtain the at least one piece of inclination difference information that corresponds to the background inclination information and the at least one piece of foreground inclination information.

16. The information insertion apparatus according to claim 12, wherein the processing circuitry is configured to:
acquire a ratio of each piece of slope information in the background inclination information to corresponding slope information in apiece of the foreground inclination information, to obtain at least one piece of slope ratio information that corresponds to the piece of the foreground inclination information and the background inclination information; and
acquire a ratio of a sum of the at least one piece of slope ratio information to a quantity of the at least one piece of slope ratio information, to obtain inclination difference information that corresponds to the piece of the foreground inclination information and the background inclination information, so as to obtain the at least one piece of inclination difference information that corresponds to the background inclination information and the at least one piece of foreground inclination information.

17. The information insertion apparatus according to claim 12, wherein the processing circuitry is configured to:
acquire, when an information insertion request is received, a video according to the information insertion request;
segment the video into shots to obtain video shot information;
perform insertion entity detection on each video frame in each piece of shot information of the video shot information according to an insertion entity detection algorithm, to obtain the preset entity and a target video shot combination in which the preset entity is located; and
select the video frame from the video shot information to be inserted with the information, the video shot information to be inserted with the information being any shot information in the target video shot combination.

18. The information insertion apparatus according to claim 17, wherein the processing circuitry is configured to:
- perform insertion entity detection on each video frame in each piece of shot information of the video shot information according to the insertion entity detection algorithm, to obtain at least one insertion entity and at least one video shot combination to be inserted with the information and in which the at least one insertion entity is located;
- acquire at least one piece of time information corresponding to the at least one video shot combination to be inserted with the information;
- determine the preset entity from the at least one insertion entity according to the at least one piece of time information and insertion time information; and
- determine, from the at least one video shot combination to be inserted with the information, the target video shot combination in which the preset entity is located.

19. The information insertion apparatus according to claim 17, wherein the processing circuitry is configured to:
- complete the insertion of the target multimedia information into the video shot information to be inserted with the information according to the target video frame, to obtain video shot information inserted with the information, until the insertion of the target multimedia information into each piece of shot information in the target video shot combination is completed, to obtain a video shot combination inserted with the information;
- acquire a video shot combination not inserted with the information from the video shot information according to the video shot combination inserted with the information, the video shot combination not inserted with the information being remaining shot information other than the target video shot combination in the video shot information; and
- perform video fusion on the video shot combination inserted with the information and the video shot combination not inserted with the information to obtain target video information.

20. A non-transitory computer-readable storage medium that stores instructions which, when executed by a processor, cause the processor to perform:
- acquiring background inclination information of a preset entity in a video frame to be inserted with information, the background inclination information being of a bearing surface of the preset entity in the video frame;
- acquiring at least one piece of foreground inclination information corresponding to at least one piece of multimedia information, each of the at least one piece of foreground inclination information being of a to-be-contacted surface of the corresponding multimedia information;
- acquiring an inclination difference between the background inclination information and each of the at least one piece of foreground inclination information, to obtain at least one piece of inclination difference information;
- determining, from the at least one piece of multimedia information according to the at least one piece of inclination difference information, target multimedia information that meets an inclination difference condition; and
- inserting the target multimedia information onto the bearing surface of the preset entity of the video frame to obtain a target video frame.

* * * * *